(12) United States Patent
Zhang et al.

(10) Patent No.: US 9,601,806 B2
(45) Date of Patent: Mar. 21, 2017

(54) REDOX SHUTTLE ADDITIVES FOR LITHIUM-ION BATTERIES

(75) Inventors: Lu Zhang, Lisle, IL (US); Zhengcheng Zhang, Naperville, IL (US); Khalil Amine, Oak Brook, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 378 days.

(21) Appl. No.: 14/239,930

(22) PCT Filed: Jul. 20, 2012

(86) PCT No.: PCT/US2012/047692
§ 371 (c)(1),
(2), (4) Date: Apr. 23, 2014

(87) PCT Pub. No.: WO2013/032593
PCT Pub. Date: Mar. 7, 2013

(65) Prior Publication Data
US 2014/0234703 A1    Aug. 21, 2014

Related U.S. Application Data

(60) Provisional application No. 61/529,413, filed on Aug. 31, 2011.

(51) Int. Cl.
*H01M 10/0525* (2010.01)
*H01M 10/0567* (2010.01)
*H01M 10/42* (2006.01)

(52) U.S. Cl.
CPC ... *H01M 10/0567* (2013.01); *H01M 10/0525* (2013.01); *H01M 10/4235* (2013.01); *H01M 2300/0025* (2013.01); *Y02E 60/122* (2013.01)

(58) Field of Classification Search
CPC ......... H01M 10/0567; H01M 10/0525; H01M 2300/0025; H01M 6/168
See application file for complete search history.

(56) References Cited

U.S. PATENT DOCUMENTS

| 5,526,599 A | 6/1996 | Roussel |
| 5,709,968 A | 1/1998 | Shimizu |

(Continued)

FOREIGN PATENT DOCUMENTS

| JP | 06-338347 | 12/1994 |
| JP | 2007-114940 | 2/1995 |

(Continued)

OTHER PUBLICATIONS

International Preliminary Report on Patentability for Int'l. Appl. No. PCT/US2012/047692, mailed on Mar. 13, 2014, 9 pp.

(Continued)

*Primary Examiner* — Devina Pillay
(74) *Attorney, Agent, or Firm* — Foley & Lardner LLP

(57) ABSTRACT

An electro lye includes a compound of Formula I or IA: where each instance of $R^1$ is independently H, alkyl, alkoxy, alkenyl, aryl, heteroaryl, or cycloalkyl; each instance of $R^2$ is independently H, alkyl, alkoxy, alkenyl, aryl, heteroaryl, or cycloalkyl; each instance of $R^3$ is independently H, alkyl, alkenyl, aryl, or cycloalkyl; each instance of $R^4$ is independently H, halogen, CN, $NO_2$, phosphate, alkyl, alkenyl, aryl, heteroaryl, or cycloalkyl; x is 1, 2, 3, 4, or 5; y is 1 or 2; and z is 0, 1, 2, 3, or 4.

(I)

(Continued)

-continued

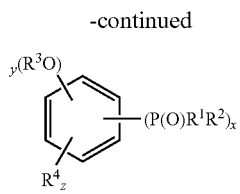

(IA)

12 Claims, 10 Drawing Sheets

(56) References Cited

U.S. PATENT DOCUMENTS

| | | |
|---|---|---|
| 5,763,119 A | 6/1998 | Adachi |
| 5,858,324 A | 1/1999 | Dahn et al. |
| 5,858,573 A | 1/1999 | Abraham et al. |
| 5,882,812 A | 3/1999 | Visco et al. |
| 5,900,385 A | 5/1999 | Dahn et al. |
| 6,004,698 A | 12/1999 | Richardson et al. |
| 6,045,952 A | 4/2000 | Kerr et al. |
| 6,143,268 A | 11/2000 | Dahn et al. |
| 6,203,944 B1 | 3/2001 | Turner et al. |
| 6,255,017 B1 | 7/2001 | Turner |
| 6,387,571 B1 | 5/2002 | Lain et al. |
| 6,436,578 B2 | 8/2002 | Turner et al. |
| 6,503,662 B1 | 1/2003 | Hamamoto et al. |
| 6,664,004 B2 | 12/2003 | Krause et al. |
| 6,680,145 B2 | 1/2004 | Obrovac et al. |
| 6,699,336 B2 | 3/2004 | Turner et al. |
| 6,964,828 B2 | 11/2005 | Lu et al. |
| 7,078,128 B2 | 7/2006 | Lu et al. |
| 7,211,237 B2 | 5/2007 | Eberman et al. |
| 7,851,092 B2 | 12/2010 | Amine et al. |
| 2003/0027048 A1 | 2/2003 | Lu et al. |
| 2003/0211390 A1 | 11/2003 | Dahn et al. |
| 2004/0121234 A1 | 6/2004 | Le |
| 2004/0121239 A1 | 6/2004 | Abe et al. |
| 2004/0131936 A1 | 7/2004 | Turner et al. |
| 2004/0179993 A1 | 9/2004 | Dahn et al. |
| 2005/0031957 A1 | 2/2005 | Christensen et al. |
| 2006/0045144 A1 | 3/2006 | Karlsen et al. |
| 2006/0046144 A1 | 3/2006 | Obrovac |
| 2006/0199080 A1* | 9/2006 | Amine ............... H01M 4/366 429/326 |
| 2007/0178370 A1 | 8/2007 | Amine et al. |
| 2009/0325065 A1 | 12/2009 | Fujii et al. |
| 2010/0040954 A1 | 2/2010 | Amine et al. |
| 2011/0250503 A1* | 10/2011 | Wilson ............... H01M 6/168 429/307 |

FOREIGN PATENT DOCUMENTS

| | | |
|---|---|---|
| JP | 07-302614 | 11/1995 |
| JP | 2000-058117 | 2/2000 |
| JP | 2002-260730 | 9/2002 |
| JP | 2004-063112 | 2/2004 |
| JP | 2004-234948 | 8/2004 |
| JP | 2004-349132 | 12/2004 |
| JP | 2005-005153 | 1/2005 |
| WO | WO-01/29920 | 4/2001 |
| WO | WO2010/074838 A1 * | 7/2010 ........ H01M 10/0567 |

OTHER PUBLICATIONS

International Search Report and Written Opinion for Int'l. Pat. Appln. No. PCT/US2012/047692, mailed on Mar. 11, 2013, 13 pp.

* cited by examiner

REDOX SHUTTLE ADDITIVES FOR LITHIUM-ION BATTERIES

CROSS-REFERENCE TO RELATED APPLICATIONS

This application is a U.S. National Phase application of International Application No. PCT/US2012/047692, filed Jul. 20, 2012, which claims the benefit of U.S. Provisional Patent Application No. 61/529,413, filed on Aug. 31, 2011, the entire disclosures of which are incorporated herein by reference for any and all purposes.

GOVERNMENT RIGHTS

The United States Government has rights in this invention pursuant to Contract No. DE-ACO2-06CH11357 between the United States Government and UChicago Argonne, LLC, representing Argonne National Laboratory.

FIELD

The present invention relates in general to lithium rechargeable batteries, and more particularly relates to additives to the non-aqueous electrolyte of lithium-ion batteries which provide intrinsic overcharge protection capability.

BACKGROUND

Rechargeable lithium-ion cells have been applied widely to the power sources for portable electronic devices due to their excellent charge-discharge cycle life, little or no memory effect, and high specific and volumetric energy. Advances in science and engineering related to lithium-ion batteries have been so tremendous that new applications of lithium-ion batteries for powering electric and hybrid electric vehicles have begun to emerge, and which could be a great relief to the global energy crisis. However, lithium-ion cells do have shortcomings, including an inability to tolerate recharging to potentials above the manufacturer's recommended end of charge potential without degradation in cycle life; the danger of overheating, or an adverse thermal event for cells recharged to potentials above the recommended end of charge potential; and difficulties in making large cells having a sufficient tolerance to electrical and mechanical abuse for consumer applications. Single and connected (e.g., series-connected) lithium-ion cells typically incorporate charge control electronics to prevent individual cells from exceeding the recommended limits of charge potential and to maintain charge balance between the cells. The additional control electronics add cost and complexity to the cells, which has negatively impacted the wide-spread acceptance of such lithium ion cells and batteries in low-cost mass market electrical and electronic devices such as flashlights, radios, CD players and the like. Organic additives including redox shuttle additives offer an alternative method to bypass the danger of overcharge in an eco-effective manner.

SUMMARY

In one aspect, compounds are provided. In one embodiment, the compounds are aryl phosphines having at least one phosphine group and one alkoxy group, where the phosphorus atom of the phosphine is bonded directly to the aryl group. In another embodiment, the compounds are aryl phosphinyl compounds, where the aryl group has at least one phosphinyl group. In another embodiment, the compounds are aryl phosphate compounds, where the aryl group has at least one phosphate group.

In another aspect, any one or more of the above compounds are used as redox shuttles in a non-aqueous electrolyte. In one embodiment, the redox shuttles provide for overcharge protection of cathode materials in lithium-ion batteries. In some embodiments, the batteries are of the 4 V class.

In another aspect, electrochemical devices are provided that incorporate the electrolytes having redox shuttles, a cathode, and an anode. In some embodiments, the electrochemical device is a lithium ion battery.

DETAILED DESCRIPTION

Figure 1:
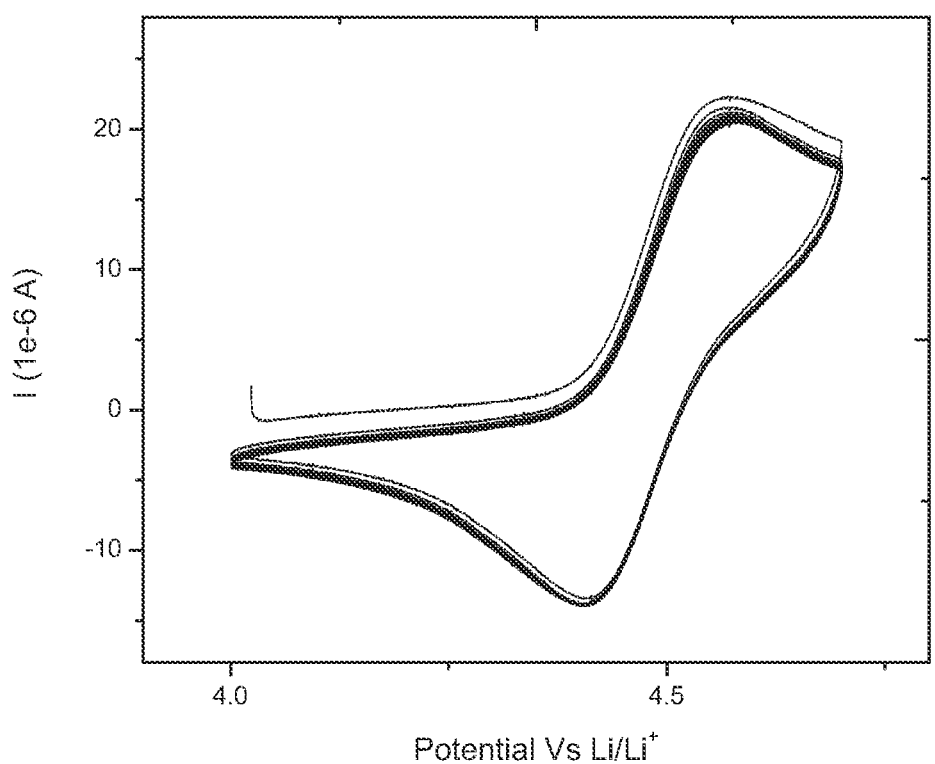
FIG. 1 is a cyclic voltammogram of an electrolyte that includes 10 mM 1,4-dimethoxyl-2,5-bis[bis (1-methylethyl) phosphinyl]-benzene (DBPB), 1.2 M $LiPF_6$ in EC/DEC (3:7 by weight) using a three electrode system (Pt working Electrode, Li counter electrode and Li reference electrode), according to Example 2.

As used herein, and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

In general, "substituted" refers to an alkyl or alkenyl group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Alkyl groups include straight chain and branched chain alkyl groups having from 1 to 12 carbon atoms, and typically from 1 to 10 carbons or, in some embodiments, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Unless expressly indicated otherwise, alkyl groups may be substituted, or unsubstituted, and if no designation is used, it is assumed that the alkyl group may either substituted or unsubstituted.

The terms "cyclic alkyl" or "cycloalkyl" refers to a saturated or partially saturated non-aromatic cyclic alkyl groups of from 3 to 14 carbon atoms and no ring heteroatoms and having a single ring or multiple rings including fused and bridged ring systems. Unless expressly indicated otherwise, cycloalkyl groups may be substituted or unsubstituted, and if no designation is used, it is assumed that the cycloalkyl group may either substituted or unsubstituted. Cycloalkyl or cyclic alkyl groups include mono-, bi- or tricyclic alkyl groups having from 3 to 14 carbon atoms in the ring(s), or, in some embodiments, 3 to 12, 3 to 10, 3 to 8, or 3 to 4, 5, 6 or 7 carbon atoms. Exemplary monocyclic cycloalkyl groups include, but not limited to, cyclopropyl, cyclobutyl, cyclopentyl, cyclohexyl, cycloheptyl, and cyclooctyl groups. Bi- and tricyclic ring systems include both bridged cycloalkyl groups and fused rings, such as, but not limited to, bicyclo[2.1.1]hexane, adamantyl, decalinyl, and the like.

Alkenyl groups include straight and branched chain and cycloalkyl groups as defined above, except that at least one double bond exists between two carbon atoms. Thus, alkenyl groups have from 2 to about 12 carbon atoms in some embodiments, from 2 to 10 carbon atoms in other embodiments, and from 2 to 8 carbon atoms in other embodiments. Examples include, but are not limited to vinyl, allyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl, among others. Representative substituted alkenyl groups may be mono-substituted or substituted more than once, such as, but not limited to, mono-, di- or tri-substituted with substituents such as those listed above. Unless expressly indicated otherwise, alkenyl groups may be substituted or unsubstituted, and if no designation is used, it is assumed that the alkenyl group may either substituted or unsubstituted.

Aryl groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. Aryl groups may be either substituted and unsubstituted aryl groups and if no designation is used, it is assumed that the aryl group may either substituted or unsubstituted. Substituted aryl groups may be mono-substituted or substituted more than once. For example, mono-substituted aryl groups include, but are not limited to, 2-, 3-, 4-, 5-, or 6-substituted phenyl or naphthyl groups, which may be substituted with substituents such as those listed above.

As defined herein, an aromatics include those groups identified as aryl groups, but where aryl group is used to define substituent groups on a primary structure, the aromatic ring is the primary structure. Thus, aromatic rings include monocyclic, bicyclic and polycyclic ring systems. Aromatic rings include, but are not limited to, benzene rings, azulene rings, biphenylene rings, indacene rings, fluorine rings, pyrene rings, phenanthrene rings, triphenylene rings, naphthacene rings, chrysene rings, anthracene rings, heptalene rings, indene rings, indane rings, pentalene rings, and naphthylene rings. In some embodiments, aromatic rings contain 6-14 carbons, and in others from 6 to 12 or even 6-10 carbon atoms in the ring portions. Aromatic rings may be either substituted and unsubstituted aryl groups and if no designation is used, it is assumed that the aromatic ring may either substituted or unsubstituted. Substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 20 carbon atoms, 7 to 14 carbon atoms or 7 to 10 carbon atoms. Unless expressly indicated otherwise, aralkyl groups may be substituted or unsubstituted, and if no designation is used, it is assumed that the aralkyl group may either substituted or unsubstituted.

Heterocyclyl groups includes non-aromatic ring compounds containing 3 or more ring members, of which one or more is a heteroatom such as, but not limited to, N, O, and S. In some embodiments, heterocyclyl groups include 3 to 20 ring members, whereas other such groups have 3 to 6, 3 to 10, 3 to 12, or 3 to 15 ring members. Heterocyclyl groups encompass unsaturated, partially saturated and saturated ring systems, such as, for example, imidazolyl, imidazolinyl and imidazolidinyl groups. Unless expressly indicated otherwise, heterocyclyl groups may be substituted or unsubstituted, and if no designation is used, it is assumed that the heterocyclyl group may either substituted or unsubstituted. Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthalenyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups may be mono-substituted or substituted more than once, such as, but not limited to, pyridyl or morpholinyl groups, which are 2-, 3-, 4-, 5-, or 6-substituted, or disubstituted with various substituents such as those listed above.

Heteroaryl groups are aromatic ring compounds containing 5 or more ring members, of which, one or more is a heteroatom such as, but not limited to, N, O, and S. Unless expressly indicated otherwise, heteroaryl groups may be substituted or unsubstituted, and if no designation is used, it is assumed that the heteroaryl group may either substituted or unsubstituted. Heteroaryl groups include, but are not limited to, groups such as pyrrolyl, pyrazolyl, triazolyl, tetrazolyl, oxazolyl, isoxazolyl, thiazolyl, pyridyl, pyridazinyl, pyrimidinyl, pyrazinyl, thiophenyl, benzothiophenyl, furanyl, benzofuranyl, indolyl, azaindolyl (pyrrolopyridyl), indazolyl, benzimidazolyl, imidazopyridyl (azabenzimidazolyl), pyrazolopyridyl, triazolopyridyl, benzotriazolyl, benzoxazolyl, benzothiazolyl, benzothiadiazolyl, imidazopyridyl, isoxazolopyridyl, thianaphthalenyl, purinyl, xanthinyl, adeninyl, guaninyl, quinolinyl, isoquinolinyl, tetrahydroquinolinyl, quinoxalinyl, and quinazolinyl groups.

Alkoxy groups are hydroxyl groups (—OH) in which the bond to the hydrogen atom is replaced by a bond to a carbon atom of a substituted or unsubstituted alkyl group as defined above. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Examples of cycloalkoxy groups include but are not limited to cyclopropyloxy, cyclobutyloxy, cyclopentyloxy, cyclohexyloxy, and the like. Representative substituted alkoxy groups may be substituted one or more times with substituents such as those listed above.

The present technology generally relates to the synthesis of, and use of, organic redox shuttles for overcharge protection of lithium ion batteries. In general, the shuttles contain at least one aromatic ring substituted with at least one phosphorus-containing group, in which at least one phosphorus atom is bonded directly to the aromatic ring. Such shuttles may be used in a variety of electrolyte applications. For example, such electrolytes include, but are not limited to, those for lithium ion batteries, capacitors, lithium air batteries, and the like.

In one aspect, a redox shuttle compound is provided that has an aromatic ring substituted with at least one phosphorus-containing group, in which at least one phosphorus atom is bonded directly to the aromatic ring. In some embodiments, the phosphorus-containing group is a oxophosphinyl group of general formula —P(O)$R^1R^2$, where $R^1$ and $R^2$ are individually H, halogen, alkyl, alkoxy, alkenyl, aryl, heteroaryl, or cycloalkyl. In some embodiments, the compounds also have at least one alkoxy group bonded to the aromatic ring. In other embodiments, the compound has at least one phosphorus containing group which is a phosphinyl group of general formula —P$R^1R^2$, where $R^1$ and $R^2$ are individually H, halogen, alkyl, alkoxy, alkenyl, aryl, heteroaryl, or cycloalkyl, and at least one alkoxy group. The aromatic ring may be a single ring, or it may be fused to one or more additional rings that may or may not be aromatic. For example, the aromatic ring may be a benzene, or a fused ring group such as, but not limited to, a naphthalene, a anthracene, a benzothiophene, a benzimidazole, a fluorenyl, or pyrene. In other embodiments, the aromatic ring is substituted with one or two hydroxy groups; one or two alkoxy groups; or one hydroxy and one alkoxy group. The aromatic ring may also contain other substituents as well.

In another embodiment, the redox shuttle compounds include an aromatic ring that has at least one tertiary carbon organic group and at least one organophosphorus group. The tertiary carbon organic group may have up to 12 carbon atoms according to some embodiments. In other embodiments, the tertiary carbon organic group is a tertiary butyl group. In some embodiments, the aromatic ring has two, or at least two, tertiary carbon organic groups which may be the same or different. If located on the same aromatic ring (e.g., a benzene ring), the tertiary carbon organic groups may for example be oriented ortho, meta or para to one another. In such compounds, the organophosphorus group may have the formula —OP(O)O$R^7$O$R^8$ where $R^7$ and $R^8$ are independently alkyl groups having up to 10 carbon atoms. For example, $R^7$ and $R^8$ may independently be an alkyl group having from 1 to 10 carbon atoms. Some such shuttles may contain two or at least two organophosphorus groups which may be the same or different. In other embodiments, the aromatic ring is substituted with one or two hydroxy groups; one or two alkoxy groups; or one hydroxy and one alkoxy group. The aromatic ring may be a single ring, or it may be fused to one or more additional rings that may or may not be aromatic. For example, the aromatic ring may be a benzene, or a fused ring group such as, but not limited to, a naphthalene, a anthracene, a benzothiophene, a benzimidazole, a fluorenyl, or pyrene. In other embodiments, the aromatic ring is substituted with one or two hydroxy groups; one or two alkoxy groups; or one hydroxy and one alkoxy group. The aromatic ring may also contain other substituents as well.

Illustrative redox shuttle compounds, include, but are not limited to, those as represented by Formula I:

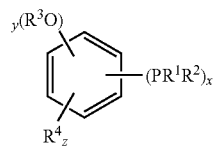

In Formula I, each instance of $R^1$ is independently H, alkyl, alkoxy, alkenyl, aryl, heteroaryl, or cycloalkyl; each instance of $R^2$ is independently H, alkyl, alkoxy, alkenyl, aryl, heteroaryl, or cycloalkyl; each instance of $R^3$ is independently H, alkyl, alkenyl, aryl, or cycloalkyl; each instance of $R^4$ is independently H, halogen, CN, $NO_2$, phosphate, alkyl, alkenyl, aryl, heteroaryl, or cycloalkyl; x is 1, 2, 3, 4, or 5; y is 1, or 2; and z is equal to 6-x-y. Where the aromatic group is a fused ring group then, x is 1, 2, 3, or 4, y is y', y' is 0, 1, or 2, and z is 0, 1, 2, or 3. In some embodiments, each instance of $R^1$ and $R^2$ are independently alkyl, alkoxy, polyether, or aryl. In some embodiments, each instance of $R^3$ is independently alkyl, haloalkyl, halogen, haloalkyl, phosphate, or polyether. In some embodiments, each instance of $R^4$ is independently H, halogen, alkyl, haloalkyl, or polyether. In some embodiments, each instance of $R^1$ and $R^2$ are independently alkyl, alkoxy, polyether, or aryl; each instance of $R^3$ is independently alkyl, halogen, haloalkyl, phosphate, or polyether; and each instance of $R^4$ is independently H, halogen, alkyl, or polyether. In some embodiments, $R^1$ and $R^2$ are independently an alkyl group or a haloalkyl group; each instance of $R^3$ is independently a $C_1$-$C_6$ alkyl; and each instance of $R_4$ is independently H or halogen. In some embodiments of Formula I, $R^1$ is methyl, ethyl, n-propyl, isopropyl, n-butyl, iso-butyl, tert-butyl, or phenyl; $R^2$ is methyl, ethyl, n-propyl, isopropyl, n-butyl, iso-butyl, tert-butyl, or phenyl; $R^3$ is H, methyl, ethyl, n-propyl, isopropyl, n-butyl, iso-butyl, or tert-butyl; and $R^4$ is H or F. In another embodiment of Formula I, $R^1$ is isopropyl, iso-butyl, tert-butyl, or phenyl; $R^2$ is isopropyl, iso-butyl, tert-butyl, or phenyl; $R^3$ is methyl, ethyl, n-propyl, isopropyl, n-butyl, iso-butyl, or tert-butyl; and $R^4$ is H or F. In one embodiment of Formula I, $R^1$ is isopropyl or phenyl; $R^2$ is isopropyl or phenyl; $R^3$ is methyl or ethyl; and $R^4$ is F. In some embodiments, x is 2, y is 2, and z is 2.

In some embodiments, the compound represented by Formula I is a compound of Formula IA:

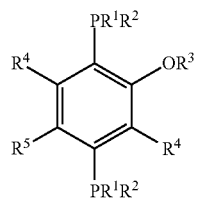

In Formula IA, each instance of $R^1$ is independently H, alkyl, alkoxy, alkenyl, aryl, heteroaryl, or cycloalkyl; each instance of $R^2$ is independently H, alkyl, alkoxy, alkenyl, aryl, heteroaryl, or cycloalkyl; each instance of $R^3$ is independently H, alkyl, alkenyl, aryl, or cycloalkyl; each instance of $R^4$ is independently H, halogen, CN, $NO_2$, phosphate, alkyl, alkenyl, aryl, heteroaryl, or cycloalkyl; and $R^5$ is H or $OR^3$. In some embodiments, each instance of $R^1$ and $R^2$ are independently alkyl, haloalkyl, alkoxy, polyether, or aryl. In some embodiments, each instance of $R^3$ is independently alkyl, haloalkyl, phosphate, or polyether. In some embodiments, each instance of $R^4$ is independently H, halogen, alkyl, haloalkyl, or polyether. In some embodiments, each instance of $R^1$ and $R^2$ are independently alkyl, alkoxy, polyether, or aryl; each instance of $R^3$ is independently alkyl, haloalkyl, phosphate, or polyether; and each instance of $R^4$ is independently H, halogen, alkyl, or polyether. In some embodiments, $R^1$ and $R^2$ are independently alkyl, haloalkyl, or aryl; each instance of $R^3$ is independently a $C_1$-$C_6$ alkyl; each instance of $R_4$ is independently H or F; and $R^5$ is H or $OR^3$. In one embodiment of Formula IA, $R^1$ is methyl, ethyl, n-propyl, isopropyl, n-butyl, iso-butyl, tert-butyl, or phenyl; $R^2$ is methyl, ethyl, n-propyl, isopropyl, n-butyl, iso-butyl, tert-butyl, or phenyl; $R^3$ is H, methyl, ethyl, n-propyl, isopropyl, n-butyl, iso-butyl, or tert-butyl; $R^4$ is H or F; and $R^5$ is H or $OR^3$. In another embodiment of Formula IA, $R^1$ is isopropyl, iso-butyl, tert-butyl, or phenyl; $R^2$ is isopropyl, iso-butyl, tert-butyl, or phenyl; $R^3$ is methyl, ethyl, n-propyl, isopropyl, n-butyl, iso-butyl, or tert-butyl; $R^4$ is H or F; and $R^5$ is H or $OR^3$. In one embodiment of Formula IA, $R^1$ is isopropyl or phenyl; $R^2$ is isopropyl or phenyl; $R^3$ is methyl or ethyl; $R^4$ is F; and $R^5$ is H or $OR^3$.

In some embodiments, the compound represented by Formula I is a compound of Formula IB:

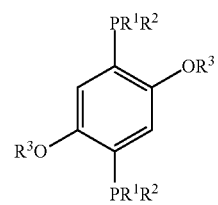

In Formula IB, each instance of $R^1$ is independently H, alkyl, alkoxy, alkenyl, aryl, heteroaryl, or cycloalkyl; each instance of $R^2$ is independently H, alkyl, alkoxy, alkenyl, aryl, heteroaryl, or cycloalkyl; and each instance of $R^3$ is independently H, alkyl, alkenyl, aryl, or cycloalkyl. In some embodiments, each instance of $R^1$ and $R^2$ are independently alkyl, alkoxy, polyether, or aryl. In some embodiments, each instance of $R^3$ is independently alkyl, haloalkyl, phosphate, or polyether. In some embodiments, each instance of $R^1$ and $R^2$ are independently alkyl, alkoxy, polyether, or aryl; and each instance of $R^3$ is independently alkyl, haloalkyl, phosphate, or polyether. In one embodiment of Formula IB, $R^1$ is methyl, ethyl, n-propyl, isopropyl, n-butyl, iso-butyl, tert-butyl, or phenyl; $R^2$ is methyl, ethyl, n-propyl, isopropyl, n-butyl, iso-butyl, tert-butyl, or phenyl; and $R^3$ is H, methyl, ethyl, n-propyl, isopropyl, n-butyl, iso-butyl, or tert-butyl. In another embodiment of Formula IB, $R^1$ is isopropyl, iso-butyl, tert-butyl, or phenyl; $R^2$ is isopropyl, iso-butyl, tert-butyl, or phenyl; and $R^3$ is methyl, ethyl, n-propyl, isopropyl, n-butyl, iso-butyl, or tert-butyl. In one embodiment of Formula IB, $R^1$ is isopropyl or phenyl; $R^2$ is isopropyl or phenyl; and $R^3$ is methyl or ethyl.

In another aspect, a compound is provided that has an aromatic ring substituted with at least one phosphorus-containing group, in which at least one phosphorus-containing group is a phosphinyl group of general formula —P(O)

$R^1R^2$, where $R^1$ and $R^2$ are individually H, halogen, alkyl, alkoxy, alkenyl, aryl, heteroaryl, or cycloalkyl. The aromatic ring may be a single ring, or it may be fused to one or more additional rings that may or may not be aromatic. For example, the aromatic ring may be a benzene, a naphthalene, a anthracene, a benzothiophene, a benzimidazole, a fluorenyl, or a pyrene. In other embodiments, the aromatic ring is substituted with one or two hydroxy groups; one or two alkoxy groups; or one hydroxy and one alkoxy group. The aromatic ring may also contain other substituents as well.

Illustrative compounds of those described in the previous paragraph include, but are not limited to, those as represented by Formula II:

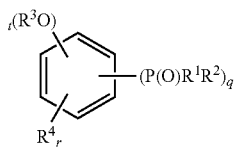

II

In Formula II, each instance of $R^1$ is independently H, alkyl, alkoxy, alkenyl, aryl, heteroaryl, or cycloalkyl; each instance of $R^2$ is independently H, alkyl, alkoxy, alkenyl, aryl, heteroaryl, or cycloalkyl; each instance of $R^3$ is independently H, alkyl, alkenyl, aryl, or cycloalkyl; each instance of $R^4$ is independently H, halogen, CN, $NO_2$, phosphate, alkyl, alkenyl, aryl, heteroaryl, or cycloalkyl; q is 1, 2, 3, 4, 5 or 6; t is 0, 1, or 2; and r is equal to 6-q-t. Where the aromatic group is a fused ring group then, q is 1, 2, 3, or 4, t is 0, 1, or 2, and r is 0, 1, 2, or 3. In some embodiments, each instance of $R^1$ and $R^2$ are independently alkyl, alkoxy, polyether, or aryl. In some embodiments, each instance of $R^3$ is independently alkyl, haloalkyl, haloalkyl, phosphate, or polyether. In some embodiments, each instance of $R^4$ is independently H, halogen, alkyl, haloalkyl, or polyether. In some embodiments, each instance of $R^1$ and $R^2$ are independently alkyl, alkoxy, polyether, or aryl; each instance of $R^3$ is independently alkyl, haloalkyl, phosphate, or polyether; and each instance of $R^4$ is independently H, halogen, alkyl, or polyether. In some embodiments, $R^1$ and $R^2$ are independently an alkyl group or a haloalkyl group; each instance of $R^3$ is independently a $C_1$-$C_6$ alkyl; and each instance of $R_4$ is independently H or halogen. In one embodiment of Formula II, $R^1$ is methyl, ethyl, n-propyl, isopropyl, n-butyl, iso-butyl, tert-butyl, or phenyl; $R^2$ is methyl, ethyl, n-propyl, isopropyl, n-butyl, iso-butyl, tert-butyl, or phenyl; $R^3$ is H, methyl, ethyl, n-propyl, isopropyl, n-butyl, iso-butyl, or tert-butyl; and $R^4$ is H or F. In another embodiment of Formula II, $R^1$ is isopropyl, iso-butyl, tert-butyl, or phenyl; $R^2$ is isopropyl, iso-butyl, tert-butyl, or phenyl; $R^3$ is methyl, ethyl, n-propyl, isopropyl, n-butyl, iso-butyl, or tert-butyl; and $R^4$ is H or F. In one embodiment of Formula II, $R^1$ is isopropyl or phenyl; $R^2$ is isopropyl or phenyl; $R^3$ is methyl or ethyl; and $R^4$ is F. In some embodiments, q is 2, r is 2, and t is 2.

In some embodiments, the compound represented by Formula II is a compound of Formula IIA:

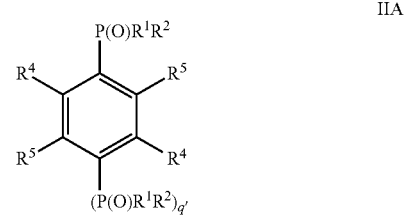

IIA

In Formula IIA, each instance of $R^1$ is independently H, alkyl, alkoxy, alkenyl, aryl, heteroaryl, or cycloalkyl; each instance of $R^2$ is independently H, alkyl, alkoxy, alkenyl, aryl, heteroaryl, or cycloalkyl; each instance of $R^3$ is independently H, alkyl, alkenyl, aryl, or cycloalkyl; each instance of $R^4$ is independently H, halogen, CN, $NO_2$, phosphate, alkyl, alkenyl, aryl, heteroaryl, or cycloalkyl; $R^5$ is H or $OR^3$; and q' is 0 or 1; where q' is 0, $P(O)R^1R^2$ at that position is H. In some embodiments, each instance of $R^1$ and $R^2$ are independently alkyl, haloalkyl, alkoxy, polyether, or aryl. In some embodiments, each instance of $R^3$ is independently alkyl, haloalkyl, phosphate, or polyether. In some embodiments, each instance of $R^4$ is independently H, halogen, alkyl, haloalkyl, or polyether. In some embodiments, each instance of $R^1$ and $R^2$ are independently alkyl, alkoxy, polyether, or aryl; each instance of $R^3$ is independently alkyl, haloalkyl, phosphate, or polyether; and each instance of $R^4$ is independently H, halogen, alkyl, or polyether. In one embodiment of Formula IIA, $R^1$ is methyl, ethyl, n-propyl, isopropyl, n-butyl, iso-butyl, tert-butyl, or phenyl; $R^2$ is methyl, ethyl, n-propyl, isopropyl, n-butyl, iso-butyl, tert-butyl, or phenyl; $R^3$ is H, methyl, ethyl, n-propyl, isopropyl, n-butyl, iso-butyl, or tert-butyl; $R^4$ is H or F; and $R^5$ is H or $OR^3$. In another embodiment of Formula IIA, $R^1$ is isopropyl, iso-butyl, tert-butyl, or phenyl; $R^2$ is isopropyl, iso-butyl, tert-butyl, or phenyl; $R^3$ is methyl, ethyl, n-propyl, isopropyl, n-butyl, iso-butyl, or tert-butyl; $R^4$ is H or F; and $R^5$ is H or $OR^3$. In one embodiment of Formula IIA, $R^1$ is isopropyl or phenyl; $R^2$ is isopropyl or phenyl; $R^3$ is methyl or ethyl; $R^4$ is F; and $R^5$ is H or $OR^3$.

In some embodiments, the compound represented by Formula II is a compound of Formula IIB:

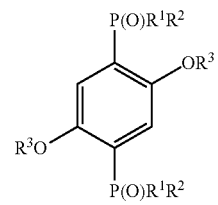

IIB

In Formula IIB, each instance of $R^1$ is independently H, alkyl, alkoxy, alkenyl, aryl, heteroaryl, or cycloalkyl; each instance of $R^2$ is independently H, alkyl, alkoxy, alkenyl, aryl, heteroaryl, or cycloalkyl; and each instance of $R^3$ is independently H, alkyl, alkenyl, aryl, or cycloalkyl. In some embodiments, each instance of $R^1$ and $R^2$ are independently alkyl, alkoxy, polyether, or aryl. In some embodiments, each instance of $R^3$ is independently alkyl, haloalkyl, phosphate, or polyether. In some embodiments, each instance of $R^1$ and $R^2$ are independently alkyl, alkoxy, polyether, or aryl; and each instance of $R^3$ is independently alkyl, haloalkyl, phosphate, or polyether. In one embodiment of Formula IIB, $R^1$ is methyl, ethyl, n-propyl, isopropyl, n-butyl, iso-butyl, tert-butyl, or phenyl; $R^2$ is H, methyl, ethyl, n-propyl, isopropyl, n-butyl, iso-butyl, tert-butyl, or phenyl; and $R^3$ is H, methyl, ethyl, n-propyl, isopropyl, n-butyl, iso-butyl, or tert-butyl. In another embodiment of Formula IIB, $R^1$ is isopropyl, iso-butyl, tert-butyl, or phenyl; $R^2$ is isopropyl, iso-butyl, tert-butyl, or phenyl; and $R^3$ is methyl, ethyl, or n-propyl. In one embodiment of Formula IIB, $R^1$ is isopropyl or phenyl; $R^2$ is isopropyl or phenyl; and $R^3$ is methyl or ethyl.

In some embodiments, the compound of Formula II is a compound of Formula II-1, II-2, II-3, II-4, II-5, or II-6.

II-1
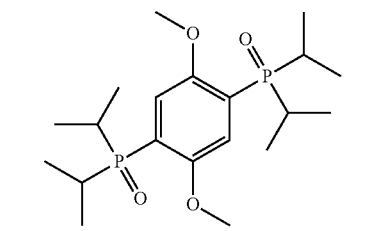

II-2
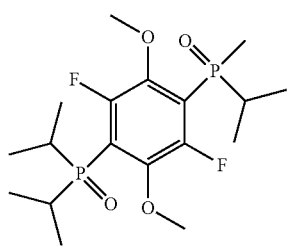

II-3
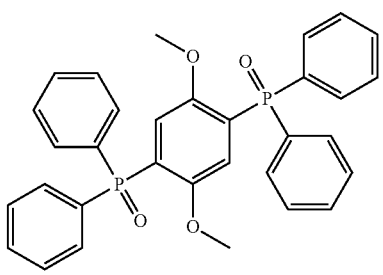

II-4
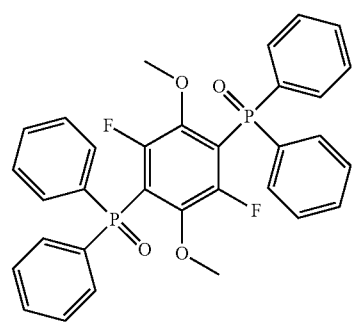

II-5
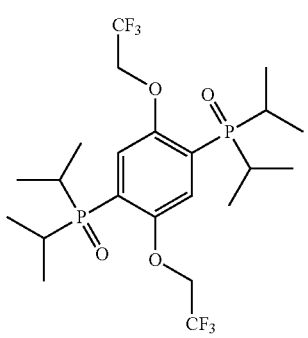

II-6
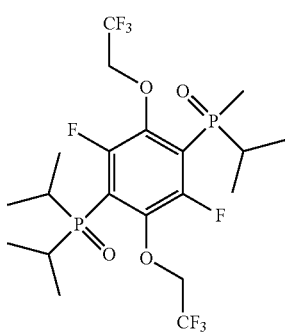

In another aspect, a compound is provided that has an aromatic ring substituted with at least one phosphorus-containing group, in which at least one phosphorus-containing group is a phosphate group of general formula —OP(O)(OR$^7$)(OR$^8$), where $R^7$ and $R^8$ are individually H, alkyl, alkenyl, aryl, heteroaryl, or cycloalkyl. The aromatic ring may be a single ring, or it may be fused to one or more additional rings that may or may not be aromatic. For example, the aromatic ring may be a benzene, a naphthalene, a anthracene, a benzothiophene, a benzimidazole, a fluorenyl, or a pyrene. In other embodiments, the aromatic ring is substituted with one or two hydroxy groups; one or two alkoxy groups; or one hydroxy and one alkoxy group. The aromatic ring may also contain other substituents as well.

Illustrative compounds, according to some embodiments, include, but are not limited to, those as represented by Formula III:

III
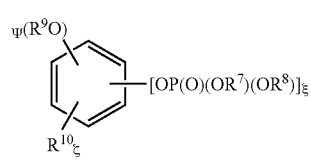

In Formula III, each instance of $R^7$ is a $C_1$-$C_{10}$ alkyl; each instance of $R^8$ is a $C_1$-$C_{10}$ alkyl; each instance of $R^9$ is independently H, alkyl, alkenyl, aryl, or cycloalkyl; each instance of $R^{10}$ is independently a tertiary alkyl; ξ is 1, 2, 3, 4, or 5; Ψ is 0, 1, or 2; and ζ is 1, 2, or 3. Where the aromatic group is a fused ring group then, ξ is 1, 2, or 3, ψ is 0, 1, or 2, and ζ is 1, 2, or 3. In some embodiments, each instance of $R^7$ and $R^8$ are independently methyl, ethyl, n-propyl, isopropyl, n-butyl, isobutyl, tert-butyl, pentyl, isopentyl, neopentyl, n-hexyl, or cyclohexyl. In some embodiments, each instance of $R^9$ is independently alkyl, haloalkyl, halogen, haloalkyl, phosphate, or polyether. In some embodiments, each instance of $R^{10}$ is tert-butyl or neo-pentyl. In some embodiments, each instance of $R^7$ and $R^8$ are independently alkyl, alkoxy, polyether, or aryl; each instance of $R^9$ is independently alkyl, halogen, haloalkyl, phosphate, or polyether; and each instance of $R^{10}$ is tert-butyl or neo-pentyl. In some embodiments, $R^7$ and $R^8$ are independently methyl, ethyl, n-propyl, isopropyl, n-butyl or tert-butyl; each instance of $R^9$ is independently a $C_1$-$C_6$ alkyl; and each instance of $R^{10}$ is tert-butyl.

The compound represented by Formula III includes a compound of Formula IIIA:

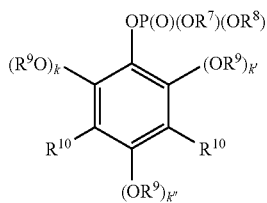

IIIA

In Formula IIIA, $R^7$ is a $C_1$-$C_{10}$ alkyl; $R^8$ is a $C_1$-$C_{10}$ alkyl; each instance of $R^9$ is independently H, alkyl, alkenyl, aryl, or cycloalkyl; each instance of $R^{10}$ is independently H or a tertiary alkyl with the proviso that at least one $R^{10}$ is other than H; and k, k', and k" are independently 0 or 1, where k, k', or k" is 0, the $OR^9$ group is H. In one embodiment, where one $OR^9$ group is H, at least one of the other $OR^9$ groups is other than H. In some embodiments, $R^7$ and $R^8$ are independently methyl, ethyl, n-propyl, isopropyl, n-butyl, isobutyl, tert-butyl, pentyl, isopentyl, neopentyl, n-hexyl, or cyclohexyl. In some embodiments, each instance of $R^{10}$ is H, tert-butyl or neo-pentyl (—CH$_2$C(CH$_3$)$_3$). In some embodiments, $R^7$ and $R^8$ are independently alkyl, alkoxy, polyether, or aryl; each instance of $R^9$ is independently alkyl, halogen, haloalkyl, phosphate, or polyether; and each instance of $R^{10}$ H, tert-butyl or neo-pentyl. In some embodiments, $R^7$ and $R^8$ are independently methyl, ethyl, n-propyl, isopropyl, n-butyl or tert-butyl; each instance of $R^9$ is independently a $C_1$-$C_6$ alkyl; and each instance of $R^{10}$ is H or tert-butyl. In one embodiment, $R^7$ and $R^8$ are independently methyl, ethyl, n-propyl, isopropyl, n-butyl or tert-butyl; each instance of $R^9$ is independently a $C_1$-$C_6$ alkyl; and each instance of $R^{10}$ is tert-butyl. In one embodiment, k and k' are 1 and k" is 0. In one embodiment, k and k" are 0 and k' is 1. In one embodiment, k' and k" are 0 and k is 1. In one embodiment, k, k', and k" are 0.

In some embodiments, the compound represented by Formula III is a compound of Formula IIIB-1, IIIB-2, or IIIB-3:

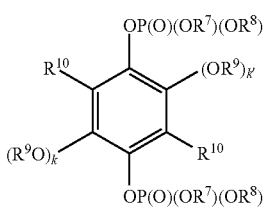

IIIB-1

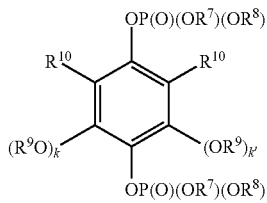

IIIB-2

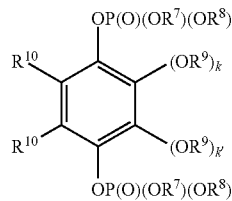

IIIB-3

In Formulas IIIB-1, -2, and -3, each instance of $R^7$ is independently a $C_1$-$C_{10}$ alkyl; each instance of $R^8$ is independently a $C_1$-$C_{10}$ alkyl; each instance of $R^9$ is independently H, alkyl, alkenyl, aryl, or cycloalkyl; each instance of $R^{10}$ is independently H or a tertiary alkyl with the proviso that at least one $R^{10}$ is other than H; and k and k' are independently 0 or 1, where k or k' is 0, the $OR^9$ group is H. In one embodiment, where one $OR^9$ group is H, at least one of the other $OR^9$ groups is other than H. In some embodiments, $R^7$ and $R^8$ are independently methyl, ethyl, n-propyl, isopropyl, n-butyl, isobutyl, tert-butyl, pentyl, isopentyl, neopentyl, n-hexyl, or cyclohexyl. In some embodiments, each instance of $R^{10}$ is H, tert-butyl or neo-pentyl. In some embodiments, $R^7$ and $R^8$ are independently alkyl, alkoxy, polyether, or aryl; each instance of $R^9$ is independently alkyl, halogen, haloalkyl, phosphate, or polyether; and each instance of $R^{10}$ is H, tert-butyl or neo-penty. In some embodiments, $R^7$ and $R^8$ are independently methyl, ethyl, n-propyl, isopropyl, n-butyl or tert-butyl; each instance of $R^9$ is independently a $C_1$-$C_6$ alkyl; and each instance of $R^{10}$ is H or tert-butyl. In one embodiment, k and k' are 1. In one embodiment, k is 0 and k' is 1. In one embodiment, k' is 0 and k is 1. In one embodiment, k and k' are 0.

In another aspect, a process is provided for the preparation of the compounds of Formula I and Formula II. The process includes reacting an aryl halide with a phosphine halide in the presence of a base to form the compound(s) represented by Formula I. In some embodiments, the aryl halide is an alkoxy aryl halide. For example, the aryl halide may be 1,4-dibromo-2,5-dimethoxybenzene. The phosphine halide may be compound of general formula ClPR$^1$R$^2$, where R$^1$ and R$^2$ are as defined above. The base may be an alkyl lithium compound such as, but not limited to, methyl lithium or butyl lithium. The aryl phosphine treated with an oxidizing agent to oxidize the compound represented by Formula I to the compound(s) represented by Formula II.

In another aspect, a process is provided for the preparation of the compounds of Formula III. The process includes reacting an aryl halide with a chlorophosphonate (ClOP(OR$^7$)(OR$^8$)) halide in the presence of a base. The resulting aryl phosphonate is then oxidized with a material such as a peroxide to form the compound(s) represented by Formula III, as illustrated by the following scheme:

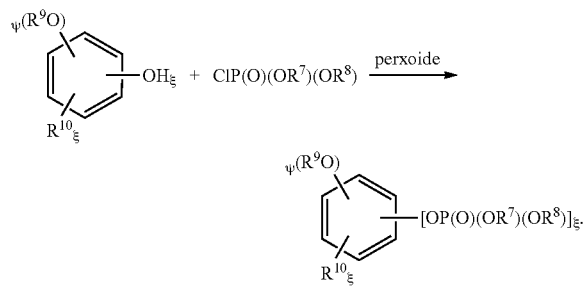

Any of the above compounds of Formulas I, II, or III, and their sub-formulas of IA, IB, IIA, IIB, II-1, II-2, II-3, II-4, II-5, II-6, IIIA, IIIB-1, IIIB-2, or IIIB-3, may be used as a redox shuttle in a electrolyte, either singly or as a combination of any two or more such compounds. Such electrolytes include the redox shuttle, a salt, and a polar aprotic solvent. The electrolytes are typically non-aqueous. As used herein, non-aqueous means that the water content of the electrolyte or solvent is minimal, or only an adventitious amount of water is present. In some embodiments, less than 20 ppm of water is present. In other embodiments, less than 15 ppm of water is present. In various other embodiments, less than 10 ppm, or even less than 5 ppm of water is present.

In one embodiment, the redox shuttle has a redox potential from about 3.5 V to about 5.0 V. In some embodiments, the redox shuttle has a redox potential from about 4.2 V to about 4.8 V.

A variety of charge carrying media may be employed in the electrolyte. Exemplary media are liquids or gels capable of solubilizing sufficient quantities of the salt and the redox shuttle so that a suitable quantity of charge can be transported from the positive electrode to negative electrode. Exemplary charge carrying media can be used over a wide temperature range, e.g., from about −30° C. to about 70° C. without freezing or boiling, and are stable in the electrochemical window within which the cell electrodes and shuttle operate. Representative charge carrying media, i.e. solvents, include, but are not limited to, ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butyrolactone, methyl difluoroacetate, ethyl difluoroacetate, dimethoxyethane, diglyme (bis(2-methoxyethyl) ether), combinations of any two or more such materials.

A variety of salts may be employed in the electrochemical device, and will be known to those of skill in the art. In some embodiments, the salt is a lithium salt. Illustrative lithium salts are stable and soluble in the charge-carrying media. Suitable lithium salts include, but are not limited to, $LiPF_6$, $LiBF_4$, $LiClO_4$, $LiB(C_2O_4)_2$, $LiBF_2(C_2O_4)$, $LiN(CF_3SO_2)_2$, $LiN(C_2F_5SO_2)_2$, $LiAsF_6$, $LiC(CF_3SO_2)_3$, and mixtures of any two or more such salts.

In some embodiments, the electrolyte may also include an additional redox shuttle, or a mixture of additional redox shuttles. Such additional redox shuttles, if present, will have an electrochemical potential above the positive electrode's maximum normal operating potential. Thus the additional redox shuttle selection is guided, at least in part, by the positive electrode selection. As a general guide, the additional redox shuttle may have, for example, a redox potential from about 0.3 V to 0.6 V above the positive electrode's maximum normal operating potential. For example, the additional redox shuttle may have a redox potential of from about 3.7 to about 4.7 V vs. Li/Li$^+$, from about 3.7 to about 4.4 V vs. Li/Li$^+$, from about 3.7 to about 4.2 V vs. Li/Li$^+$, or from about 3.7 to about 4.0 V vs. Li/Li$^+$. For example, LiFePO$_4$ positive electrodes have a recharge plateau around 3.45 V vs. Li/Li$^+$, and illustrative additional redox shuttles will have a redox potential from about 3.75 to about 4.05 V vs. Li/Li$^+$. As a second example, LiMnPO$_4$ and LiMn$_2$O$_4$ electrodes have a recharge plateau around 4.1 V vs. Li/Li$^+$. Illustrative additional redox shuttles may have a redox potential from about 4.4 to about 4.7 V vs. Li/Li$^+$.

Additional redox shuttles include, but are not limited to, metallocenes as shown, for example, in U.S. Pat. No. 5,526,599; anisoles and dianisoles as shown, for example, in U.S. Pat. Nos. 6,045,952 and 5,763,119; halogenated aromatics as shown, for example, in U.S. Pat. Nos. 5,763,119 and 5,709,968, PCT Published Application No. WO 01/29920, and Japanese Patent Application Publication No. 2004/234948; tertiary-alkyl-substituted benzenes as shown, for example, in U.S. Pat. No. 6,503,662 and U.S. Patent Application Publication No. 2004/0121239; dimethoxybenzenes, halogenated methoxybenzenes, substituted benzodioxazoles or methylenedioxybenzenes, alkyl polyethers, and substituted pyrimidines as shown, for example, in PCT Published Application No. WO 01/29920 A1; highly-substituted aromatics as shown, for example, in U.S. Pat. No. 6,387,571; substituted biphenyls as shown, for example, in Japanese Patent Application Publication No. 2004/063112; aromatic ethers and terphenyl derivatives as shown, for example, in Japanese Patent Application Publication No. 2000/058117; urethane-substituted aromatics as shown, for example, in Japanese Patent Application Publication No. 2002/260730; nitrogen-containing aromatics as shown, for example, in U.S. Pat. No. 6,004,698 and Japanese Patent Application Publication No. 06/338347; thianthrenes as shown, for example, in U.S. Pat. No. 5,858,573 and Japanese Patent Application Publication Nos. 2004/349132 and Ser. No. 07/302,614; and sulfur-based compounds as shown, for example, in U.S. Pat. No. 5,882,812.

Illustrative additional redox shuttles include, but are not limited to, anisole, substituted anisoles (or methoxybenzenes) such as 2-methylanisole, 2-ethylanisole, 2-tert-butyl-anisole, 3-tert-butyl-anisole, 4-tert-butyl-anisole, 2-bromoanisole, 4-bromoanisole, 2,4,6-tribromoanisole, 3,5 dichloroanisole, 2,4,6-trichloroanisole, 4-bromo-2-fluoroanisole, 1-cyclopropyl-2-methoxybenzene, 1-nitro-3-tert-butyl-2-methoxybenzene, 1-cyano-3-tert-butyl-2-methoxybenzene, 1,4-di-tert-butyl-2-methoxybenzene, 5-tert-butyl-1,3-dinitro-2-methoxybenzene, 1-(benzyloxy)-4-bromo-2-methoxybenzene, 1,3,5-tri-tert-butyl-2-methoxybenzene, 1-[(2-ethylhexyl)oxy]-4-methoxybenzene, 1-hexadecyloxy-4-methoxybenzene, 1-((((ethoxycarbonyl)oxy)imino) methyl)-4-methoxybenzene and 2-tert-pentyl-anisole; alkoxy-substituted phthalates such as 4-methoxyphthalate; alkoxy-substituted catechols such as 3-methoxycatechol; substituted di-alkoxybenzenes such as 2-methyl-1,4-dimethoxybenzene, 2,3-dimethyl-1,4-dimethoxybenzene, 2,5-dimethyl-1,4-dimethoxybenzene, 2,6-dimethyl-1,4-dimethoxybenzene, 2,3,6-trimethyl-1,2-dimethoxybenzene, 2,3,5,6-tetramethyl-1,4-dimethoxybenzene, 4-methyl-1,2-dimethoxybenzene, 2,3,5,6-tetramethyl-1,4-dimethoxybenzene, 2-ethyl-1,4-dimethoxybenzene, 2,3-diethyl-1,4-dimethoxybenzene, 2,5-diethyl-1,4-dimethoxybenzene, 2,6-diethyl-1,4-dimethoxybenzene, 2,3,6-triethyl-1,2-dimethoxybenzene, 2,3,5,6-tetraethyl-1,4-dimethoxybenzene, 4-ethyl-1,2-dimethoxybenzene, 2,5-diisopropyl-1,4-dimethoxybenzene, 2-tert-butyl-1,4-dimethoxybenzene, 2,3-di-tert-butyl-1,4- dimethoxybenzene, 2,5-di-tert-butyl-1,4-dimethoxybenzene, 2,5-di-tert-pentyl-1,4-dimethoxybenzene, 2,5-di-tert-butyl-3,6-dinitro-1,4-dimethoxybenzene, 2,5-di-tert-butyl-3,6-di-cyano-1,4-dimethoxybenzene, 2,5-di-tert-butyl-1,4-dimethoxybenzene, 2,5-di-tert-butyl-1,4-diethoxybenzene, 2,5-dicyclohexyl-1,4-dimethoxybenzene, 4-tert-butyl-1,2-dimethoxybenzene, 4,5-di-tert-butyl-1,2-dimethoxybenzene, 4,5-di-tert-pentyl-1,2-dimethoxybenzene and 4,5-di-tert-butyl-1,2-diethoxybenzene; substituted alkoxynaphthalenes such as 4,8-di-tert-butyl-1,5-dimethoxynaphthalene; polycyclic compounds such as 1-(3-(2,4-cyclopentadien-1-ylidene)-1-butenyl)4-methoxybenzene, 9,10-dimethoxy-1,4:5,8-dimethano-1,2,3,4,5,6,7,8-octahydroanthracene and 9,10-dimethoxy-1,4:5,8-diethano-1,2,3, 4,5,6,7,8-octahydroanthracene; and salts such as 3-amino-n-dodecyl-4-methoxybenzene-sulfonamide and 3-methoxybenzyl bromide.

The non-aqueous electrolytes may also include an electrode stabilizing compound to protect the electrodes from degradation. Electrode stabilizing compounds are those that may be reduced or polymerized on the surface of a negative electrode to form a passivation film on the surface of the negative electrode. Electrode stabilizing compounds also include those that may be oxidized or polymerized on the surface of the positive electrode to form a passivation film on the surface of the positive electrode. In some embodiments, electrolytes of the invention further include mixtures of the two types of electrode stabilizing compounds. The compounds are typically present at a concentration of about 0.001 to 8 wt %.

Illustrative electrode stabilizing compounds include, but are not limited to, a linear, branched or cyclic hydrocarbon having at least one oxygen atom and at least one aryl, alkenyl or alkynyl group. The passivating film formed from such electrode stabilizing compounds may also be formed from a substituted aryl compound or a substituted or unsubstituted heteroaryl compound where the compound includes at least one oxygen atom. Alternatively, a combination of two compounds may be used. In some such embodiments, one compound is selective for forming a passivating film on the cathode to prevent leaching of metal ions and the other compound can be selective for passivating the anode surface to prevent or lessen the reduction of metal ions at the anode.

Illustrative electrode stabilizing compounds include, but are not limited to, 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2 amino-3 vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2 vinyloxetane, 2-vinyloxy-cyclopropanone, 3-(N-vinylamino)cyclohexanone, 3,5-divinyl furoate, 3-vinylazetidin-2-one, 3 vinylaziridin 2 one, 3 vinylcyclobutanone, 3 vinylcyclopentanone, 3 vinyloxaziridine, 3 vinyloxetane, 3-vinylpyrrolidin-2-one, 4,4 divinyl-3 dioxolan 2-one, 4 vinyltetrahydropyran, 5-vinylpiperidin-3-one, allylglycidyl ether, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone, or a mixture of any two or more thereof. In some embodiments the electrode stabilizing additive may be a cyclotriphosphazene that is substituted with F, alkyloxy, alkenyloxy, aryloxy, methoxy, allyloxy groups, or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)-cyclotriphosphazene, (diaryloxy)(trifluoro)(methoxy)cyclotriphosphazene compounds, or a mixture of two or more such compounds. In some embodiments, the electrode stabilizing additive is vinyl ethylene carbonate, vinyl carbonate, or 1,2-diphenyl ether, or a mixture of any two or more such compounds. Other representative electrode stabilizing additives may include compounds with phenyl, naphthyl, anthracenyl, pyrrolyl, oxazolyl, furanyl, indolyl, carbazolyl, imidazolyl, or thiophenyl groups. For example, electrode stabilizing additives may be aryloxpyrrole, aryloxy ethylene sulfate, aryloxy pyrazine, aryloxy-carbazole trivinylphosphate, aryloxy-ethyl-2-furoate, aryloxy-o-terphenyl, aryloxy-pyridazine, butyl-aryloxy-ether, divinyl diphenyl ether, (tetrahydro-furan-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4 divinyl-1-methyl pyrrole, aryloxyoxetane, aryloxy-phenyl carbonate, aryloxypiperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxyquinoline, diaryloxycyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o terphenyl, N-methyl pyrrole, naphthalene, or a mixture of any two or more electrode stabilizing compounds.

Other illustrative electrode stabilizing compounds include, but are not limited to, spirocyclic hydrocarbons containing at least one oxygen atom and at least one alkenyl or alkynyl group. For example, such stabilizing compounds include those having Formula IV:

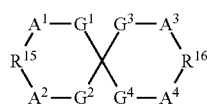

IV

In Formula IV, $A^1$, $A^2$, $A^3$, and $A^4$ are independently O or $CR^{12}R^{13}$; provided that $A^1$ is not O when $G^1$ is O, $A^2$ is not O when $G^2$ is O, $A^3$ is not O when $G^3$ is O, and $A^4$ is not O when $G^4$ is O; $G^1$, $G^2$, $G^3$, and $G^4$ are independently O or $CR^{12}R^{13}$; provided that $G^1$ is not O when $A^1$ is O, $G^2$ is not O when $A^2$ is O, $G^3$ is not O when $A^3$ is O, and $G^4$ is not O when $A^4$ is O; $R^{15}$ and $R^{16}$ are independently a substituted or unsubstituted divalent alkenyl or alkynyl group. Illustrative examples of Formula III include, but are not limited to, 3,9 divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9 dimethylene-1,5,7,11-tetraoxaspiro[5.5]undecane, 3,9 diethylidene-1,5,7,11-tetraoxaspiro[5.5]undecane, or a mixture of any two or more such compounds. Furthermore, mixtures of any two or more electrode stabilizing compounds may also be used in the electrolytes of the present invention.

In some embodiments, the electrolyte may include an anion receptor. In some embodiments, the anion receptor is a Lewis acid. In other embodiments, the anion receptor is a borane, a boronate, a borate, a borole, or a mixture of any two or more such compounds. In some embodiments, the anion receptor is a compound of the Formula V:

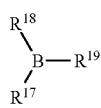

V

In Formula V, each $R^{17}$, $R^{18}$, and $R^{19}$ is independently halogen, alkyl, aryl, halogen-substituted alkyl, halogen-substituted aryl, or $OR^{17}$; or any two of $R^{17}$, $R^{18}$, and $R^{19}$ together with the atoms to which they are attached, form a heterocyclic ring having 5-9 members, and $R^{17}$ is at each occurrence independently alkyl, aryl, halogen-substituted alkyl, or halogen-substituted aryl.

In some embodiments, the anion receptors include, but are not limited to, tri(propyl)borate, tris(1,1,1,3,3,3-hexafluoropropan-2-yl)borate, tris(1,1,1,3,3,3-hexafluoro-2-phenylpropan-2-yl)borate, tris(1,1,1,3,3,3-hexafluoro-2-(trifluoromethyl)propan-2-yl)borate, triphenyl borate, tris(4-fluorophenyl)borate, tris(2,4-difluorophenyl)borate, tris(2,3,5,6-tetrafluorophenyl)borate, tris(pentafluorophenyl)borate, tris(3-(trifluoromethyl)phenyl)borate, tris(3,5-bis(trifluoromethyl)phenyl)borate, tris(pentafluorophenyl)borane, or a mixture of any two or more thereof. Further suitable anion receptors include 2-(2,4-difluorophenyl)-4-fluoro-1,3,2-benzodioxaborole, 2-(3-trifluoromethyl phenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetra(trifluoromethyl)-1,3,2-benzodioxaborolane, 2-(3,5-difluorophenyl-4,4,5,5-tetrakis(trifluoromethyl)-1,3,2-dioxaborolane, 2-(3,5-difluorophenyl-4,4,5,5-tetrakis(trifluoromethyl)-1,3,2-dioxaborolane, 2-pentafluorophenyl-4,4,5,5-tetrakis(trifluoromethyl)-1,3,2-dioxaborolane, bis(1,1,1,3,3,3-hexafluoroisopropyl)phenylboronate, bis(1,1,1,3,3,3-hexafluoroisopropyl)-3,5-difluorophenylboronate, bis(1,1,1,3,3,3-hexafluoroisopropyl) pentafluorophenylboronate, or a mixture of any two or more such compounds.

In some embodiments, each anion receptor is present at a concentration of about 0.001 to about 10 wt %.

Other additives may also be used in the electrolytes and electrochemical devices. For example, compounds such as, but not limited to, $Li_2B_{12}X_{12-n}H_n$, $Li_2B_{10}X_{10-n'}H_{n'}$, or a mixture of two or more of such compounds may be included in the electrolytes. In such compounds, X is OH, $OCH_3$, F, Cl, Br, or I, n is an integer from 0 to 12, and n' is an integer from 0 to 10. Such compounds may be present from about 0.001 to 15 wt %. In some embodiments, the compounds is present from about 0.001 to about 8 wt %.

In some embodiments, the electrolyte is a gel electrolyte including at least one aprotic solvent; at least one lithium salt; at least one crosslinking agent; at least one monofunctional monomeric compound; and at least one radical reaction initiator. In some embodiments, the gel electrolyte also includes other electrode stabilization additives and other electrolyte additives. Suitable crosslinking agents include, but are not limited to, those as may be represented by Formula VI:

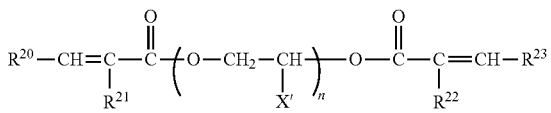

VI

In Formula V, $R^{20}$, $R^{21}$ and $R^{23}$ are each independently H, alkyl having from 1 to 12 carbon atoms, or alkenyl having from 2 to 12 carbon atoms; and where X' is a H, methyl, or ethyl, and n is an integer from 1 to 15. In some embodiments, X' is H and n is 1. In some embodiments, the compound of Formula VI is ethylene glycol dimethacrylate or a poly(ethyleneglycol)dimethacrylate. In other embodiments, the compound of Formula VI is propylene glycol dimethacrylate or a poly(propyleneglycol)dimethacrylate. Monofunctional monomeric compounds may be used for the control of the crosslinking density of the gel electrolyte. Suitable monofunctional monomeric compounds include those of Formula VII:

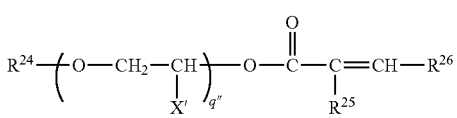

VII

In Formula V, $R^{24}$ is an alkyl having from 1 to 12 carbon atoms; $R^{25}$ and $R^{26}$ are each independently a H, alkyl having from 1 to 12 carbon atoms, or alkenyl group from 2 to 12 carbon atoms; X' is H, methyl or ethyl; and q" is an integer from 1 to 20. In some embodiments, the compound of Formula VII is ethylene glycol ethyl ether methacrylate or a poly(ethylene glycol) ethyl ether methacrylate. In other embodiments, the compound of Formula VII is propylene glycol ethyl ether methacrylate or a poly(propylene glycol) ethyl ether methacrylate.

Crosslinking agents and monofunctional monomeric compounds provide a physical framework, or gel, after crosslinking to host the liquid phase. Variation of the amount of the crosslinking agent and monofunctional monomeric compound in the gel may impact the conductivity of the gel electrolyte, due to changes in viscosity. Lower viscosity gels are prepared with higher concentrations of monofunctional monomeric compound, as compared to the concentration of monofunctional monomeric compound used for higher viscosity gels. Without being bound by theory, higher viscosity gels may be expected to have lower electrochemical conductivity, while lower viscosity gels may be expected to have higher electrochemical conductivity. However, other electrochemical properties of the gel electrolyte, or an electrochemical cell prepared with the gel electrolyte, such as oxidation potential and reduction potential, are not expected to be impacted.

Polymerization of crosslinking agents and monofunctional monomeric compounds are known to those of skill in the art. For example, monofunctional monomeric compounds may be polymerized by thermal and photoinitiation. Representative thermal initiators include, but are not limited to, an azo compound, a peroxide compound, bismaleimide, or a mixture of any two or more thereof. One example of an azo compound is azoisobutyronitrile. One example of a peroxide compound is benzoylperoxide. Representative photoinitiators include, but are not limited to, 1-hydroxyl-phenyl-ketone, benzophenone, 2-hydroxyl-2-methyl-1-phenyl-propanone, 2-hydroxyl-1-[4-(2-hydroxy)phenyl]-2-methyl-1-propanone, methylbenzoylformate, oxy-phenyl-acetic acid 2-[2-oxo-2-phenyl-acetoxy-ethoxy]-ethyl ester, oxy-phenyl-acetic 2-[2-hydroxy-ethoxy]-ethyl ester, $\alpha,\alpha$-dimethoxy-$\alpha$-phenylacetophenone, 2-benzyl-2-(dimethyl-amino)-1-[4-(4-morpholinyl)phenyl]-1-propanone, diphenyl (2,4,6-trimethylthio)phenyl)-phosphine oxide, phosphine oxide, phenyl bis(2,4,6-trimethyl benzoyl), bis($\eta^5$-2,4-cyclopentadien-1-yl) bis[2,6-difluoro-3-(1H-pyrrol-1-yl)phenyl]titanium, iodonium (4-methylphenyl)-[4-(2-methylpropyl)phenyl]-hexafluorophosphate, or a mixture of two or more thereof. In some instances the photoinitiator is a UV initiator.

Any of the compounds and electrolytes described above may be used in an electrochemical device having an anode (negative electrode), a cathode (positive electrode), and the electrolyte. A variety of negative electrodes may be employed in the electrochemical devices. Illustrative negative electrodes may include, but are not limited to, $Li_{4/3}Ti_{5/3}O_4$; the lithium alloy compositions described in U.S. Pat. Nos. 6,203,944; 6,255,017; 6,436,578; 6,664,004; and 6,699,336; or U.S. Pat. Application Nos. 2003/0211390; 2004/013 1936; 2005/0031957; and 2006/046144; and graphitic carbon including those having a spacing between (002) crystallographic planes, d 002, of 3.45 Å>d 002>3.354 Å and existing in forms such as powders, flakes, fibers or spheres (e.g., mesocarbon microbeads). Other such anode materials are known in the art.

A variety of cathodes may be employed in the electrochemical devices. Illustrative cathode materials include, but are not limited to, spinel, olivine, carbon-coated olivine, $LiMnPO_4$, $LiMn_2O_4$, $LiCoPO_4$, $LiCoO_2$, $LiFePO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $LiMet_{0.5}Mn_{1.5}O_4$, $Li_{1+x'}Ni_\alpha Mn_\beta Co_\gamma Met'_\delta O_{2-z'}F_{z'}$, $A_{n'}B_2(XO_4)_3$ (Nasicon), vanadium oxide, or mixtures of any two or more thereof, wherein Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; and $0 \leq x \leq 0.3$, $0 \leq y \leq 0.5$, $0 \leq z \leq 0.5$, $0 \leq x' \leq 0.4$, $0 \leq \alpha \leq 1$, $0 \leq \beta \leq 1$, $0 \leq \gamma \leq 1$, $0 \leq \delta \leq 0.4$, $0 \leq z' \leq 0.4$, and $0 \leq n' \leq 3$. Other cathode materials include lithium transition metal oxides such as those disclosed in U.S. Pat. Nos. 5,858,324; 5,900,385; 6,143,268; 6,964,828; 7,078,128; 7,211,237; and 6,680,145, and U.S. Pat. Application Nos. 2003/0027048; 2004/0121234; 2004/0179993; and 2006/045144; and combinations of any two or more such materials.

To make the anodes and cathodes, the above materials are typically applied to a current collector to transfer energy from the anode or cathode material to a load circuit. A variety of current collectors may be employed in electrochemical devices. Often the anode and cathode will be carried on the current collectors, with the current collector serving as a support. The current collector may also be an adjacent material, e.g., a shell of a lithium-ion button cell. A variety of arrangements will work, so long as the anode and cathode is configures to make suitable electrical contact with their associated current collectors.

Some guidelines may aid in selecting the negative electrode current collector. To prevent lithium capture during recharging, the negative electrode current collector has a lithium alloying potential below the negative electrode's minimum normal operating potential. Thus the negative electrode current collector selection will be guided in part by the negative electrode selection. To discourage or prevent current collector dissolution during overdischarging, it may be helpful to employ a negative electrode current collector having a dissolution potential above the shuttle reduction potential. Thus, the negative electrode current collector selection may also be guided in part by the shuttle selection.

Illustrative anode current collectors include, but are not limited to, aluminum, copper, stainless steel including for example 300 series and 400 series stainless steels, titanium, tantalum, niobium, INCONEL™ nickel chromium alloys, and combinations of any two or more such materials. Aluminum has a lithium alloying potential of about 0.3 V vs Li. Most of the other listed materials are believed to have a lithium alloying potentials below 0 V. Copper is believed to have a dissolution potential below about 4.0 V. Most of the other listed materials are believed to have dissolution potentials above 4.0 V. The current collector may be monolithic throughout, or may have a surface or exposed layer whose composition is different from the composition of the underlying current collector material. In one embodiment, the anode current collector includes aluminum.

When the negative electrode has a larger irreversible first cycle capacity loss than that of the positive electrode, the positive electrode will normally remain at an elevated potential during overdischarge. The positive electrode current collector will be held near the same elevated potential and will not be susceptible to lithium capture during recharging or dissolution during overdischarging. Accordingly there are fewer constraints on selection of the positive electrode current collector. Representative positive electrode current collectors include, but are not limited to, aluminum, stainless steels (e.g., 300 series and 400 series stainless steels), titanium, tantalum, niobium, INCONEL alloys, combinations of any two or more such materials.

The negative or positive electrode may contain additives such as will be familiar to those skilled in the art. For example, negative electrodes may include carbon black, and positive electrode may include carbon black, flake graphite and the like.

The negative and positive electrode capacities may optionally be selected to provide an excess negative electrode capacity. This enables the shuttle to provide overcharge protection. About 10 to about 20% excess negative electrode capacity is recommended. Lesser or greater excess negative electrode capacities may be employed if desired.

All publications, patent applications, issued patents, and other documents referred to in this specification are herein incorporated by reference as if each individual publication, patent application, issued patent, or other document was specifically and independently indicated to be incorporated by reference in its entirety. Definitions that are contained in text incorporated by reference are excluded to the extent that they contradict definitions in this disclosure.

The present technology, thus generally described, will be understood more readily by reference to the following examples, which are provided by way of illustration and are not intended to be limiting.

EXAMPLES

Example 1

Synthesis of 1,4-dimethoxyl-2,5-bis[bis(1,1-methylethyl)phosphinyl]-benzene(DBPB), prepared according to Scheme 1.

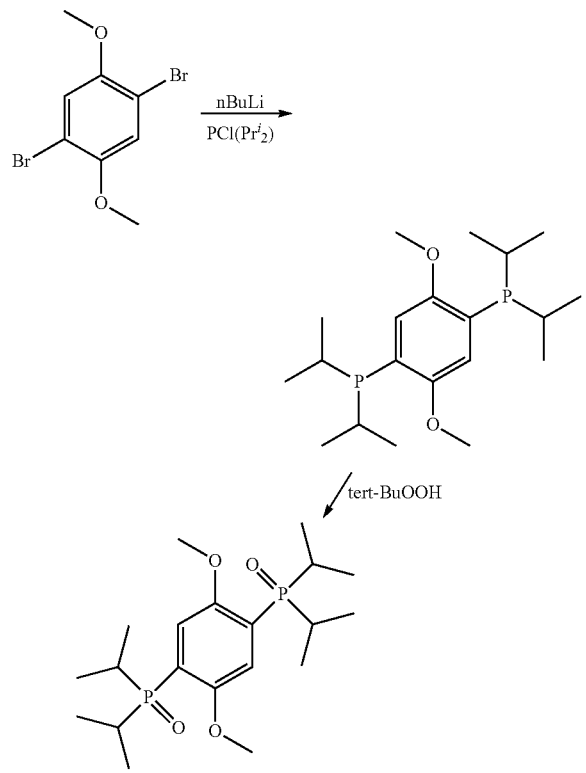

Scheme I.

Under argon, n-BuLi (5.3 mL of 2.5M solution in hexanes, 13.25 mmol) was slowly added to a solution of 1,4-dibromo-2,5-dimethoxybenzene (2 g, 6.8 mmol) in 100 mL Et$_2$O at −70° C. The mixture was allowed to warm to ambient temperature, with stirring, held at ambient temperature for 3 hours, and then re-cooled to −70° C. Diisopropylchlorophosphine (3.21 mL, 20.0 mmol) was then added to the mixture, after which the solution was allowed to warm up to ambient temperature while stirring. The solvent was removed in vacuo, and the residue was dissolved in dichloromethane (DCM) and filtered. The filtrate was treated with silica gel and stirred for 30 min. The solid was then filtered off and the filtrate collected. The solvent was removed from the filtrate in vacuo to afford a yellowish solid. The yellow solid was dissolved again in DCM, tert-butyl hydroperoxide (4 ml, 28 mmol) added, and the mixture was stirred for another 3 hours. A metasulfite sodium saturated solution was then added to the mixture. After stirring for 30 min, the reaction was partitioned between DCM and water. The organic solution was collected and the solvent removed in vacuo to provide a crude product, which was crystallized from DCM solution to afford pure 1,4-dimethoxyl-2,5-bis[bis(1-methylethyl)phosphinyl]-benzene (45% yield). $^1$H NMR (300 MHz, CDCl$_3$): δ/ppm 7.3 (q, J=3 Hz, 2H), 3.87 (s, 6H), 2.43 (q, J=4.5 Hz, 4H), 1.26 (q, J=4.2 Hz, 12H), 0.99 (q, J=4.2 Hz, 12H).

Example 2

FIG. 1 is a cyclic voltammogram of an electrolyte of 1.2 M LiPF$_6$ in EC/DEC (3:7, by weight) with 10 mM DBPB. As shown in FIG. 1, the oxidation begins at about 4.4 V vs. Li, and the oxidation current peaks at about 4.6 V vs. Li. The reducing reaction is exhibited as a big hump during the reverse scan. The reduction current peaks at about 4.4 V vs. Li. In case of overcharging, the reduction reaction occurs at the negative electrodes which as a potential of about 0 V vs. Li (i.e. much less than the peak current of the DBPB. Accordingly, DBPB is capable of protecting lithium-ion batteries against overcharged.

Example 3

Figure 2:
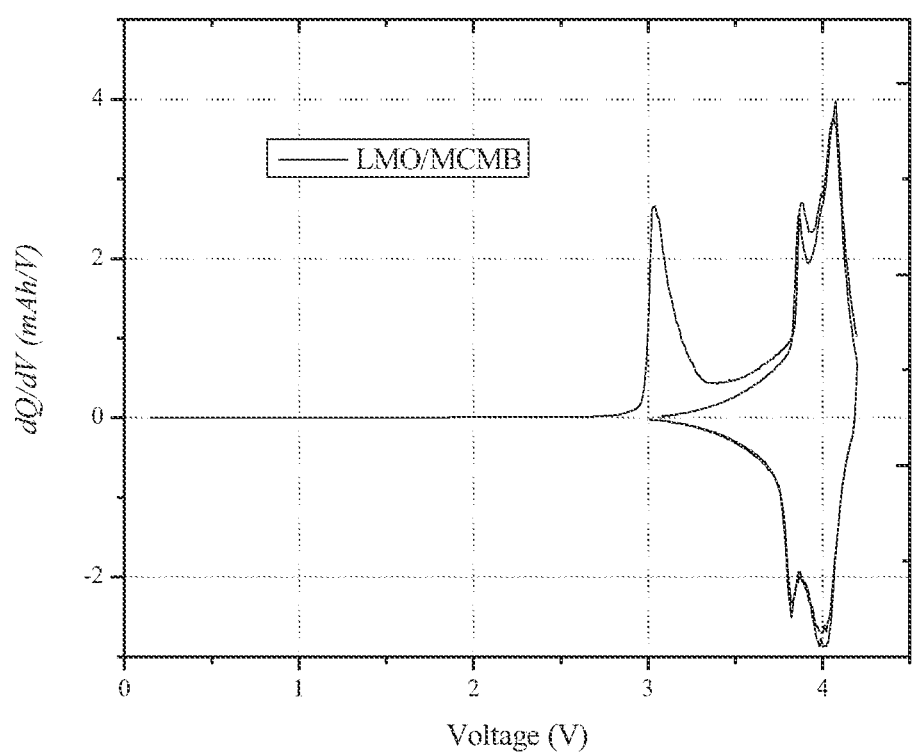
FIG. 2 is a differential capacity profile of cell using MCMB and spinel $LiMn_2O_4$ as electrodes and containing 5 wt % DBPB during a 2 cycle formation process, according to Example 3.

FIG. 2 is a differential capacity profile of cell using MCMB and spinel LiMn$_2$O$_4$ as electrodes and containing 5 wt % DBPB during the 2 cycle formation process. A reduction peak is exhibited at about 2.8 V, indicating the decomposition of the DBPB at the anode side.

Example 4

Figure 3:
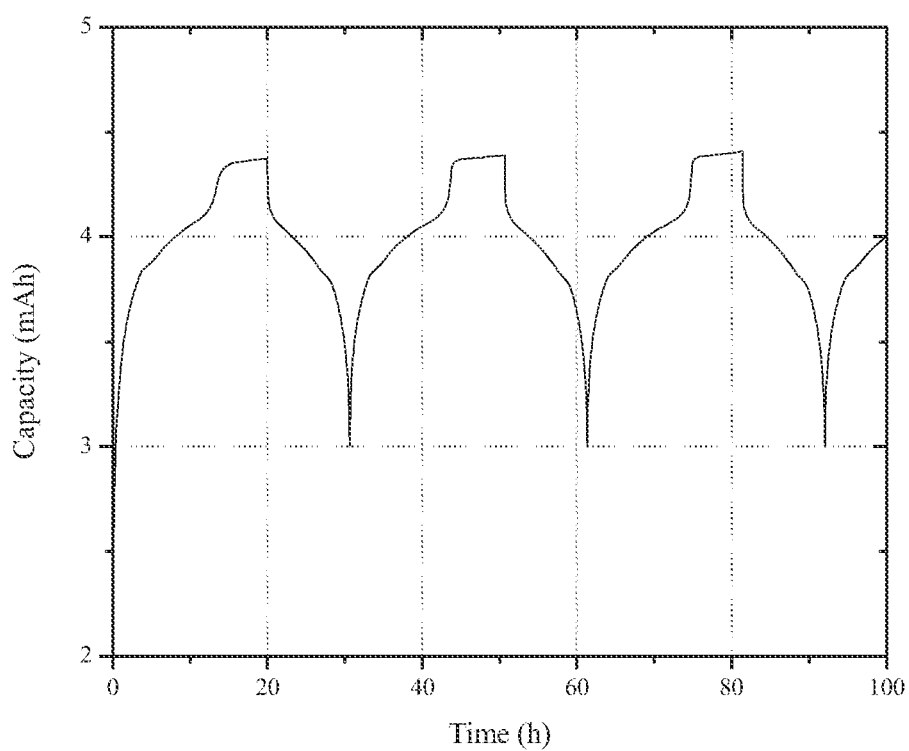
FIG. 3 is an overcharge test voltage profile of $LiMn_2O_4$/MCMB cells containing 5 wt % DBPB in 1.2M $LiPF_6$ in EC/EMC (3:7 by weight) during the course of 0-100 hours at a charging rate of C/10 and overcharge an rate of 100%, according to Example 4.

FIG. 3 is a overcharge test voltage profile of LMO/MCMB cells containing 5 wt % DBPB in 1.2M LiPF6 in EC/EMC (3:7 by weight) over the course of 0-100 h. The cell was charged at a C/10 rate for 20 hours, and then discharged at a C/10 rate to 3.0 V. Normal charging takes place between 3.0V and 4.2 V. Once the cells are fully charged, the voltage rises rapidly to about 4.4 V, where the shuttle is activated and carries the current through the lithium-ion cells. The cell voltage is nearly invariant due to the redox shuttle added, otherwise the cell voltage would rise rapidly until triggering electrochemical reactions of the cell components. After the 20 hour charging period, the current was reversed and the cell was discharged to a cutoff voltage of 3.0 V.

Example 5

Figure 4:
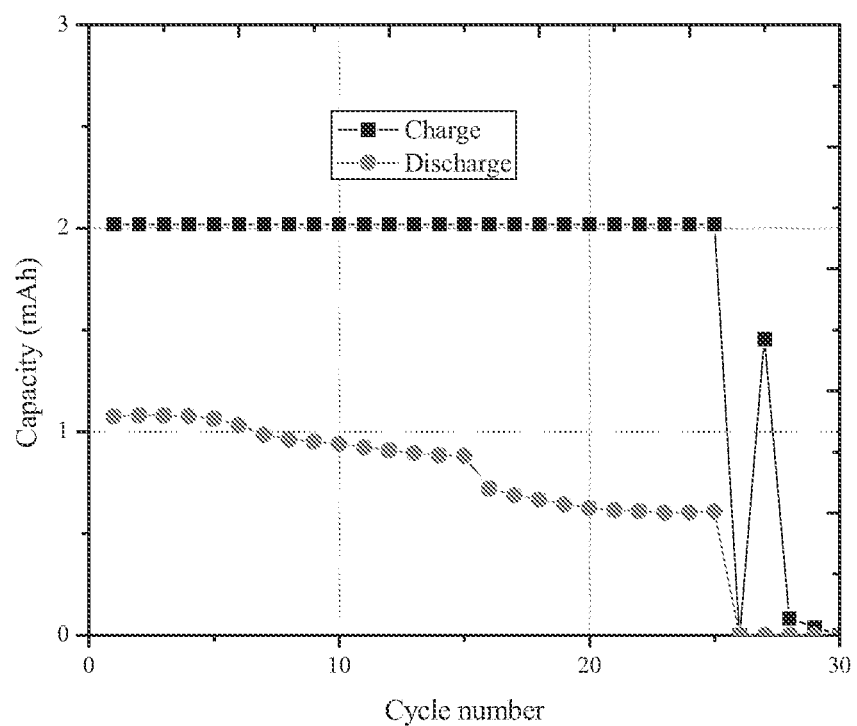
FIG. 4 is an overcharge test capacity profile of $LiMn_2O_4$/MCMB cells containing 5 wt % DBPB in 1.2M LiPF6 in EC/EMC (3:7 by weight), at a charging rate of C/10 and overcharge rate of 100%, according to Example 5.

FIG. 4 is an overcharge test capacity profile of LMO/MCMB cells containing 5 wt % DBPB in 1.2M LiPF$_6$ in EC/EMC (3:7 by weight). Charging rate is C/10 and overcharge rates are 100%. The cell was charged at a C/10 rate for 20 hours, and then discharged at a C/10 rate to 3.0 V. It is believed that the difference between the charge capacity and discharge capacity represents the charge that is carried by redox shuttle. During each cycle, about 100% capacity was shunted by redox shuttle and the overcharge rate is 200%.

Example 6

Figure 5:
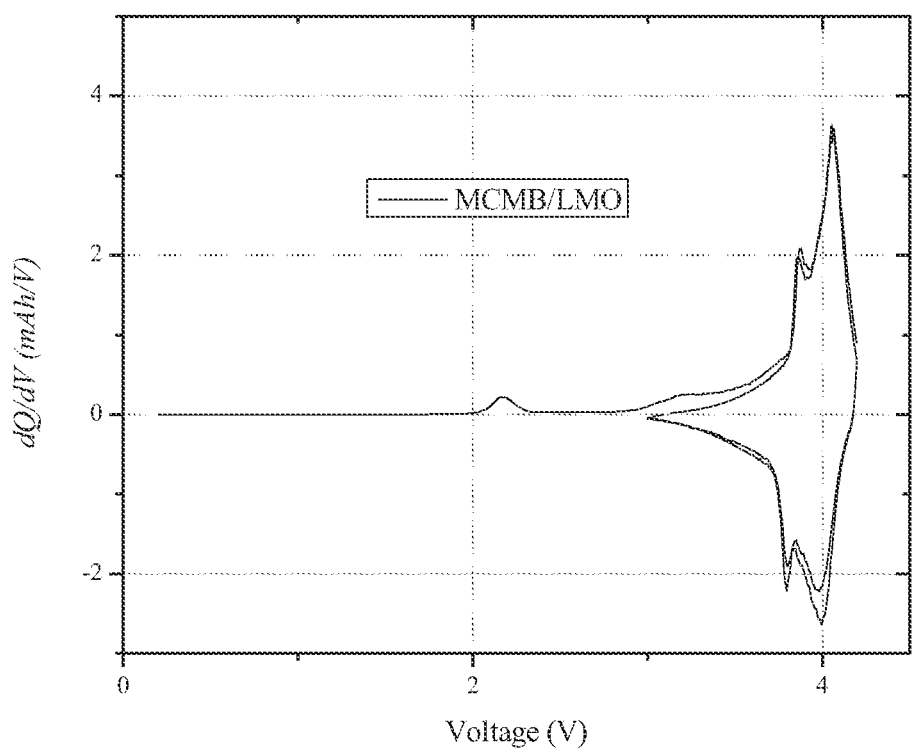
FIG. 5 is a differential capacity profile of cells using MCMB and $LiMn_2O_4$ as electrodes and containing 5 wt % DBPB plus 2 wt % LiBOB during the 2 cycle formation process, according to Example 6.

FIG. 5 is a differential capacity profile of cells using MCMB and LMO as electrodes and containing 5 wt % DBPB plus 2 wt % LiBOB during the 2 cycle formation process. The peak around 2.1 V is attributed to the reduction of LiBOB, which is believed to significantly depress the decomposition of the DBPB, which is supported by the much lower peak at 3.3 V, where the decomposition of DBPB takes place. The addition of LiBOB is believed to improve the stability of the DBPB at the anode.

Example 7

Figure 6:
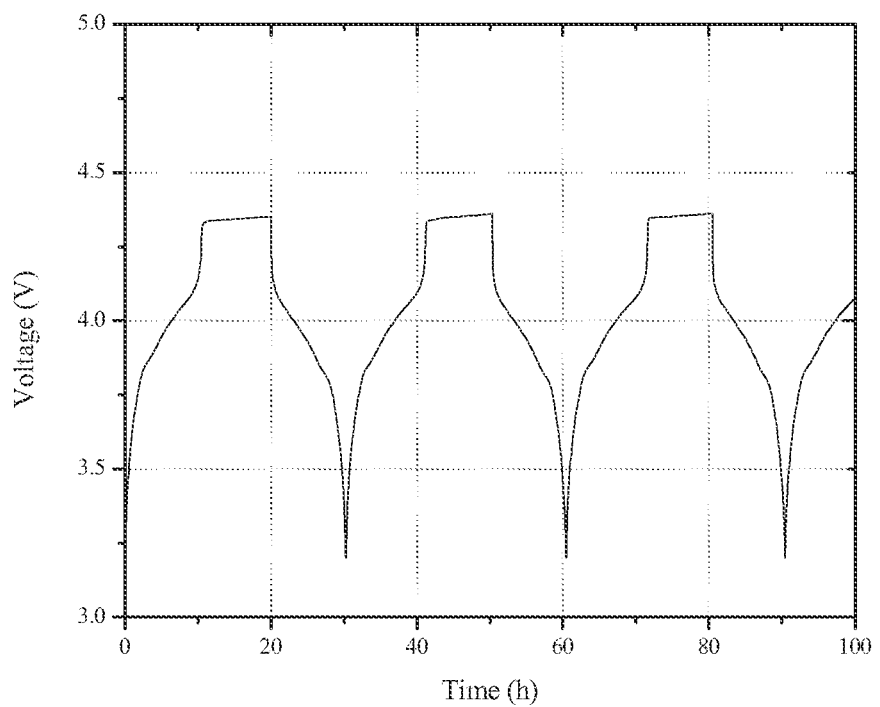
FIG. 6 is an overcharge test capacity profile of LMO/MCMB cells containing 5 wt % DBPB plus 2 wt % LiBOB in 1.2M $LiPF_6$ in EC/EMC (3:7 by weight) over the course of 0-100 hours, at a charging rate of C/10 and overcharge rate of 100%, according to Example 7.

FIG. 6 includes overcharge test voltage profiles of LMO/MCMB cells containing 5 wt % DBPB plus 2 wt % LiBOB in 1.2M LiPF$_6$ in EC/EMC (3:7 by weight) during the course of 0-100 h. The charging rate was C/10 and overcharge rates were 100%. The cell was charged at a C/10 rate for 20 hours, and then discharged at a C/10 rate to 3.0 V. Similar to FIG. 5, normal charging takes place from 3.0 V to 4.2 V. Once the cells are fully charged, the voltage rises rapidly to about 4.4 V, where the shuttle is activated and carries the current through the lithium-ion cells. The cell voltage is nearly invariant with the redox shuttle added. Without the redox shuttle the cell voltage would rise rapidly until triggering electrochemical reaction of the cell components. After the 20 hours charging period, the current was reversed and the cell was discharged to a cutoff voltage of 3.0 V.

Example 8

Figure 7:
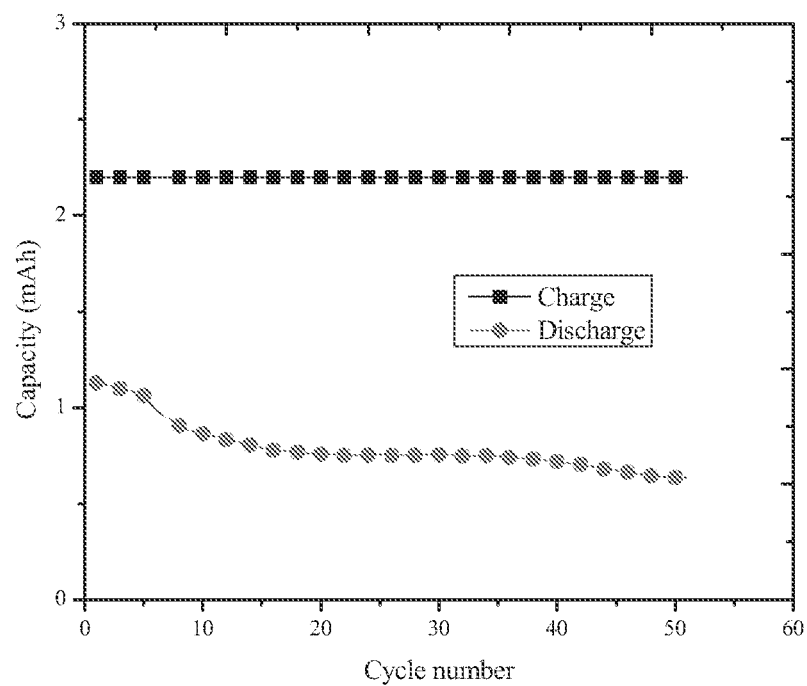
FIG. 7 is an overcharge test capacity profile of LMO/MCMB cell containing 5 wt % DBPB plus 2 wt % LiBOB in 1.2M LiPF6 in EC/EMC (3:7 by weight), at a charging rate of C/10 and overcharge rate of 100%, according to Example 8.

FIG. 7 is an overcharge test capacity profile of LMO/MCMB cell containing 5 wt % DBPB plus 2 wt % LiBOB in 1.2M LiPF$_6$ in EC/EMC (3:7 by weight). The charging rate was C/10, and the overcharge rate was 100%. The cell was charged at a C/10 rate for 20 hours, and then discharged at a C/10 rate to 3.0 V. Compared to FIG. 4, the overcharge cycle number is much higher with the addition of LiBOB, indicating the improved stability resulting from the LiBOB SEI layer.

Example 9

Figure 8:
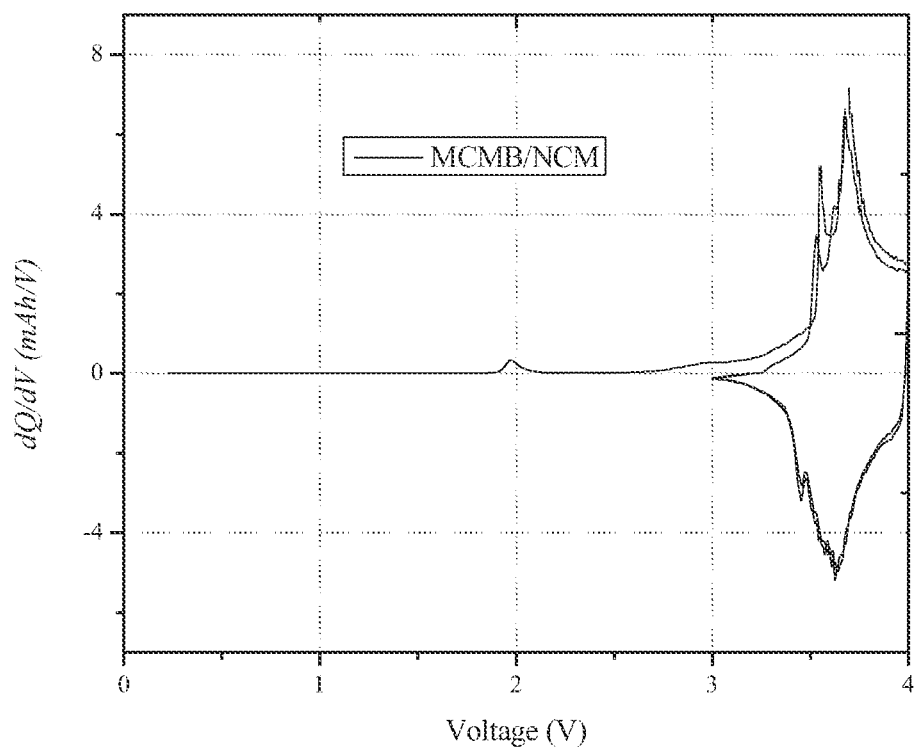
FIG. 8 is a differential capacity profile of cells using MCMB and $Li_{1.1}[Mn_{1/3}Ni_{1/3}Co_{1/3}]_{0.9}O_2$ as electrodes and containing 5 wt % DBPB plus 2 wt % LiBOB during the 2 cycle formation process, according to Example 9.

FIG. 8 illustrates differential capacity profiles of cells using MCMB and Li$_{1.1}$[Mn$_{1/3}$Ni$_{1/3}$Co$_{1/3}$]$_{0.9}$O$_2$ as electrodes and containing 5 wt % DBPB plus 2 wt % LiBOB during the 2 cycle formation process. Similar to FIG. 7, the addition of LiBOB, confirmed by the peak at 2.0 V, improved the stability of DBPB on the anode.

Example 10

Figure 9:
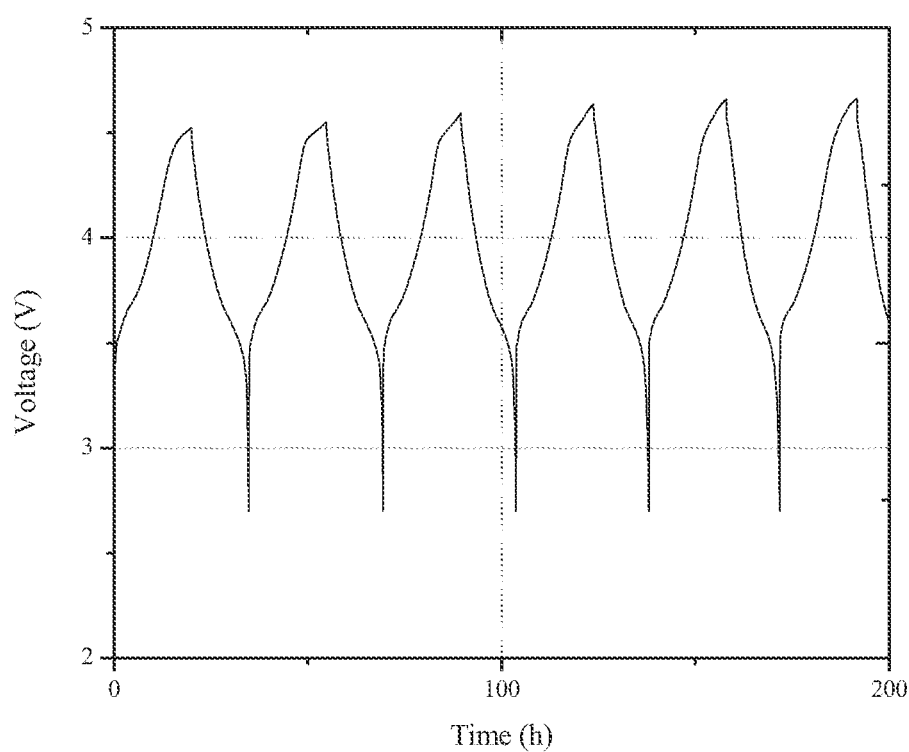
FIG. 9 is an overcharge test capacity profile of $Li_{1.1}[Mn_{1/3}Ni_{1/3}Co_{1/3}]_{0.9}O_2$/MCMB cells containing 5 wt % DBPB plus 2 wt % LiBOB in 1.2M $LiPF_6$ in EC/EMC (3:7 by weight) during the course of 0-200 hours at a charging rate of C/10 and overcharge rate of 50%, according to Example 10.

FIG. 9 includes the overcharge test voltage profiles of Li$_{1.1}$[Mn$_{1/3}$Ni$_{1/3}$Co$_{1/3}$]$_{0.9}$O$_2$/MCMB cells containing 5 wt % DBPB plus 2 wt % LiBOB in 1.2M LiPF$_6$ in EC/EMC (3:7 by weight) during the course of 0-200 h. The charging rate was C/10 (at which rate the cell can be fully charged in 10 hours) and overcharge ratios (the ratio of overcharge capacity to normal capacity) were 50%. Charging rate is C/10 and overcharge rates are 100%. The cell was charged at a C/10 rate for 20 hours, and then discharged at a C/10 rate to 3.0 V. Normal charging takes place from 3.5 V to 4.2 V, and once the cells are fully charged, the voltage rises rapidly to about 4.4 V, where the shuttle is activated and carries the current through the lithium-ion cells. The cell voltage is nearly invariant with the redox shuttle added, otherwise the cell voltage would rise rapidly until triggering electrochemical reaction of the cell components. After the 20 hour charging period, the current was reversed and the cell was discharged to a cutoff voltage of 2.7 V.

Example 11

Figure 10:
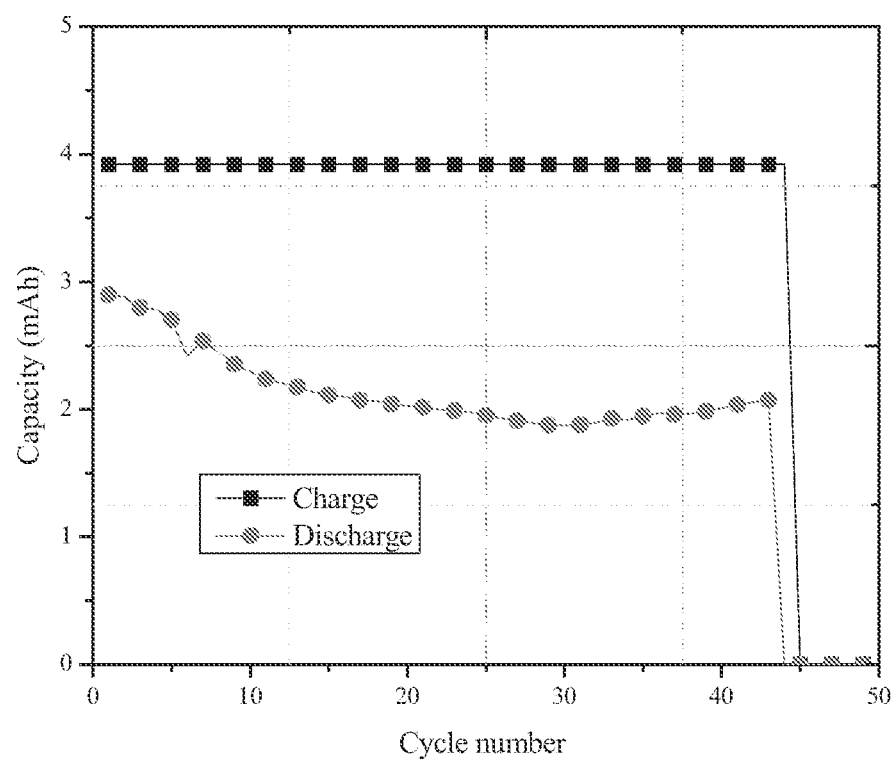
FIG. 10 is an overcharge test capacity profile of $Li_{1.1}[Mn_{1/3}Ni_{1/3}Co_{1/3}]_{0.9}O_2$/MCMB cells containing 5 wt % DBPB plus 2 wt % LiBOB in 1.2M $LiPF_6$ in EC/EMC (3:7 by weight) during the course of 0-200 hours, at a charging rate of C/10 and overcharge rate of 50%, according to Example 11.

FIG. 10 illustrates the overcharge test capacity profiles of Li$_{1.1}$[Mn$_{1/3}$Ni$_{1/3}$Co$_{1/3}$]$_{0.9}$O$_2$/MCMB cells containing 5 wt % DBPB plus 2 wt % LiBOB in 1.2M LiPF$_6$ in EC/EMC (3:7 by weight) during the course of 0-200 h. The charging rate was C/10 and overcharge rates were 50%. It is believed that the difference between the charge capacity and discharge capacity represents the charge that is carried by redox shuttle. During each cycle, about 50% capacity was shunted by redox shuttle and the overcharge rate is 50%.

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

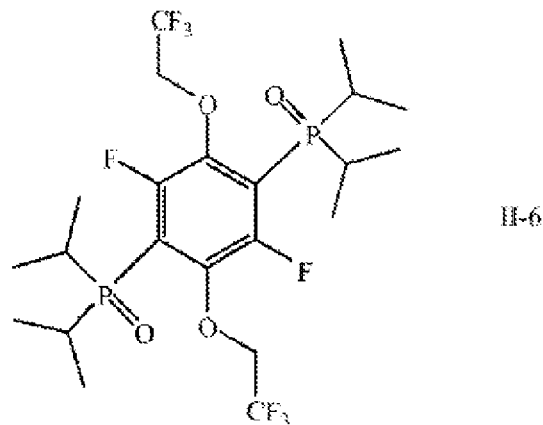

What is claimed is:

1. An electrolyte comprising:
an alkali metal salt;
a polar aprotic solvent; and
a redox shuttle;
wherein:
the redox shuttle comprises a compound represented by Formula IB:

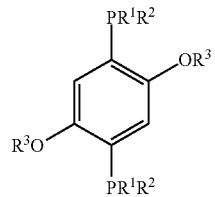

IB wherein:
each instance of $R^1$ is independently H, alkyl, alkoxy, alkenyl, heteroaryl, or cycloalkyl;
each instance of $R^2$ is independently H, alkyl, alkoxy, alkenyl, heteroaryl, or cycloalkyl; and
each instance of $R^3$ is independently H, alkyl, alkenyl, awl, or cycloalkyl;
or
a combination of any two or more thereof.

2. The electrolyte of claim 1, wherein the redox shuttle has a redox potential of from 4 V to 5 V in the electrolyte.

3. The electrolyte of claim 1, wherein a concentration of the redox shuttle in the electrolyte is from 0.0005 wt % to 50 wt %.

4. The electrolyte of claim 1, wherein the alkali metal salt is a lithium salt.

5. An electrochemical device comprising a cathode, an anode, and the electrolyte of claim 1.

6. A method of preparing an electrolyte comprising:
combining an alkali metal salt and redox shuttle in a polar aprotic solvent;
wherein:
the redox shuttle comprises a compound represented by Formula IB:

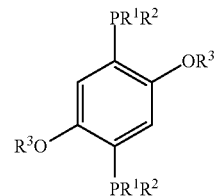

IB wherein:
each instance of $R^1$ is independently H, alkyl, alkoxy, alkenyl, heteroaryl, or cycloalkyl;
each instance of $R^2$ is independently H, alkyl, alkoxy, alkenyl, heteroaryl, or cycloalkyl; and
each instance of $R^3$ is independently H, alkyl, alkenyl, awl, or cycloalkyl;
or
a combination of any two or more thereof.

7. An electrolyte comprising:
an alkali metal salt;
a polar aprotic solvent; and
a redox shuttle;
wherein:
the redox shuttle comprises a compound represented by Formula IIB:

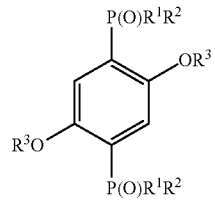

IIB wherein:
each instance of $R^1$ is independently H, alkyl, alkoxy, alkenyl, aryl, heteroaryl, or cycloalkyl;
each instance of $R^2$ is independently H, alkyl, alkoxy, alkenyl, aryl, heteroaryl, or cycloalkyl; and
each instance of $R^3$ is independently H, alkyl, alkenyl, aryl, or cycloalkyl.

8. The electrolyte of claim 7, wherein the redox shuttle has a redox potential of from 4 V to 5 V in the electrolyte.

9. The electrolyte of claim 7, wherein the redox shuttle is represented by Formula II-1, II-2, II-3, II-4, II-5, or II-6:

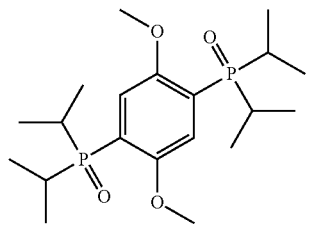

II-1

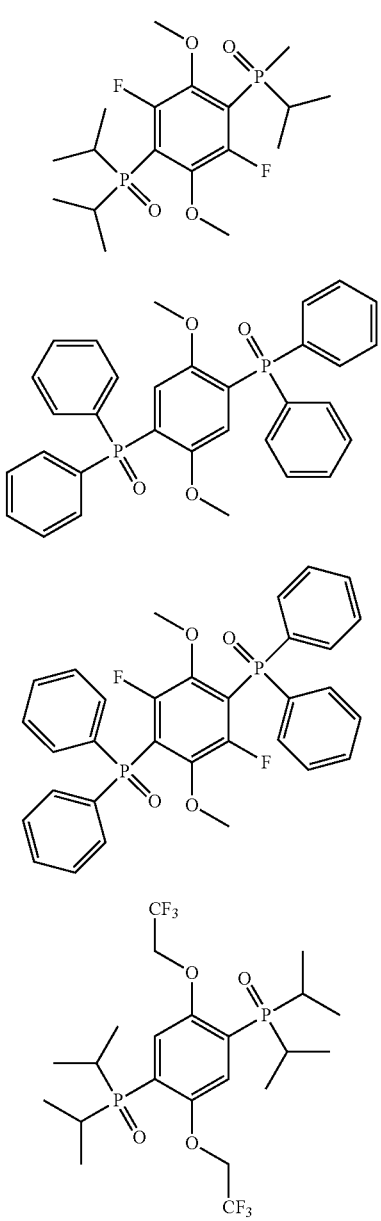

II-2

II-3

II-4

II-5

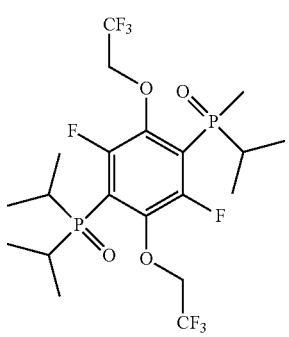

II-6

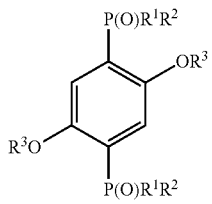

10. The electrolyte of claim 7, wherein a concentration of the redox shuttle in the electrolyte is from 0.0005 wt % to 50 wt %.

11. The electrolyte of claim 7, wherein the alkali metal salt is a lithium salt.

12. An electrochemical device comprising a cathode, an anode, and an electrolyte, the electrolyte comprising:
   an alkali metal salt;
   a polar aprotic solvent; and
   a redox shuttle;
   wherein:
      the redox shuttle comprises a compound represented by Formula IIB:

$$\text{(IIB)}$$

wherein:
   each instance of $R^1$ is independently H, alkyl, alkoxy, alkenyl, aryl, heteroaryl, or cycloalkyl;
   each instance of $R^2$ is independently H, alkyl, alkoxy, alkenyl, aryl, heteroaryl, or cycloalkyl; and
   each instance of $R^3$ is independently H, alkyl, alkenyl, aryl, or cycloalkyl.

* * * * *

UNITED STATES PATENT AND TRADEMARK OFFICE
CERTIFICATE OF CORRECTION

PATENT NO. : 9,601,806 B2  
APPLICATION NO. : 14/239930  
DATED : March 21, 2017  
INVENTOR(S) : Lu Zhang, Zhengcheng Zhang and Khalil Amine Page 1 of 2

It is certified that error appears in the above-identified patent and that said Letters Patent is hereby corrected as shown below:

In the Specification

Column 11, Lines 30-38:  
Delete misprinted Formula II-2 and replace with:

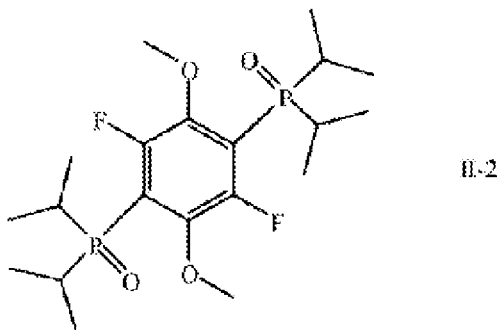

Column 12, Lines 15-27:  
Delete misprinted Formula II-6 and replace with:

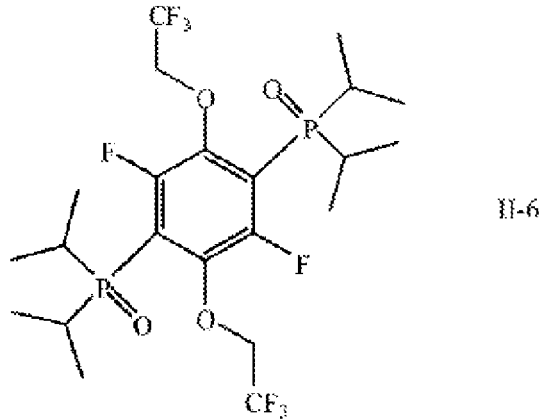

In the Claims

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,601,806 B2

Claim 1, Column 27, Line 49:
Delete "awl" and insert --aryl-- therefore

Claim 6, Column 28, Line 19:
Delete "awl" and insert --aryl-- therefore

Claim 9, Column 29, Lines 1-10:
Delete misprinted Formula II-2 and replace with:

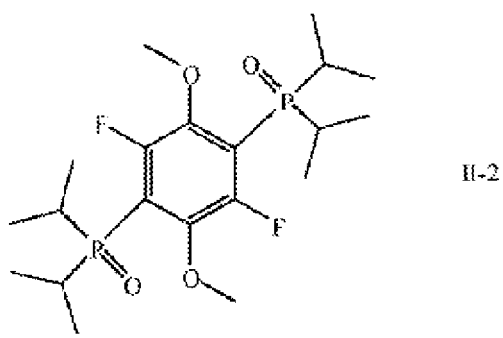

Claim 9, Column 30, Lines 1-14:
Delete misprinted Formula II-6 and replace with: